United States Patent
Chari et al.

(10) Patent No.: US 11,546,758 B2
(45) Date of Patent: Jan. 3, 2023

(54) SYSTEM AND METHOD FOR AN EXTENDER DEVICE

(71) Applicant: Roku, Inc., San Jose, CA (US)

(72) Inventors: Amalavoyal Narasimha Chari, Palo Alto, CA (US); Jim Funk, Los Gatos, CA (US); Sujatha Jagannathan, San Jose, CA (US); Liang-Jong Huang, Pleasanton, CA (US); Jason Schmidlapp, Los Gatos, CA (US); Tito Thomas, San Jose, CA (US); Ilya Asnis, San Jose, CA (US)

(73) Assignee: ROKU, INC., San Jose, CA (US)

( * ) Notice: Subject to any disclaimer, the term of this patent is extended or adjusted under 35 U.S.C. 154(b) by 16 days.

(21) Appl. No.: 17/061,996

(22) Filed: Oct. 2, 2020

(65) Prior Publication Data

US 2021/0021998 A1 Jan. 21, 2021

Related U.S. Application Data

(63) Continuation of application No. 15/994,382, filed on May 31, 2018, now Pat. No. 10,932,130.

(51) Int. Cl.
*H04L 29/06* (2006.01)
*H04W 12/06* (2021.01)
(Continued)

(52) U.S. Cl.
CPC .......... *H04W 12/06* (2013.01); *H04L 9/0643* (2013.01); *H04L 41/0803* (2013.01);
(Continued)

(58) Field of Classification Search
CPC ..... H04W 12/06; H04W 12/08; H04W 48/16; H04W 84/12; H04W 76/14; H04W 8/005;
(Continued)

(56) References Cited

U.S. PATENT DOCUMENTS 7,000,024 B1  2/2006  Champagne et al.
7,197,557 B1  3/2007  Asar et al.
(Continued)

FOREIGN PATENT DOCUMENTS

WO    WO 2018/060058 A1    4/2018

OTHER PUBLICATIONS

International Search Report and Written Opinion of the International Searching Authority directed to related International Patent Application No. PCT/US2019/034876, dated Sep. 20, 2019; 9 pages.

(Continued)

*Primary Examiner* — Yogesh Paliwal
(74) *Attorney, Agent, or Firm* — Sterne, Kessler, Goldstein & Fox P.L.L.C.

(57) ABSTRACT

Many customers have difficulty setting up a new extender device in the customer premises environment to improve their multimedia service. Some embodiments include configuring an extender device based on existing WiFi network credentials to minimize errors. Some embodiments include an application for mobile devices that may enable the transfer of network credentials from existing multimedia devices on the WiFi network to configure a new extender device in real time. For example, the configuration may be based on a customer account, a corresponding environment, and corresponding multimedia devices associated with the customer account. The extender device may be configured with the network credentials (e.g., a WiFi service set identifier (SSID) and password) that is common to the corresponding multimedia devices associated with the customer account.

20 Claims, 14 Drawing Sheets

(51) Int. Cl.
  *H04W 40/24* (2009.01)
  *H04W 8/00* (2009.01)
  *H04L 41/0803* (2022.01)
  *H04L 9/40* (2022.01)
  *H04L 9/06* (2006.01)
  *H04W 76/14* (2018.01)
  *H04W 4/80* (2018.01)

(52) U.S. Cl.
  CPC .......... *H04L 63/083* (2013.01); *H04W 8/005* (2013.01); *H04W 40/246* (2013.01); *H04W 76/14* (2018.02); *H04W 4/80* (2018.02)

(58) Field of Classification Search
  CPC .... H04W 40/246; H04W 4/80; H04L 9/0643; H04L 41/0803; H04L 41/0806; H04L 63/083
  See application file for complete search history.

(56) References Cited

U.S. PATENT DOCUMENTS

| | | |
|---|---|---|
| 7,573,823 B2 | 8/2009 | Halme |
| 8,255,006 B1 | 8/2012 | Chavez et al. |
| 8,744,352 B2 | 6/2014 | Pochop, Jr. |
| 9,641,411 B1 | 5/2017 | Rogan et al. |
| 9,727,873 B1 | 8/2017 | Wood et al. |
| 9,807,629 B1 | 10/2017 | Varlakov et al. |
| 10,932,130 B2 | 2/2021 | Chari et al. |
| 2004/0136327 A1 | 7/2004 | Sitaraman et al. |
| 2008/0056200 A1 | 3/2008 | Johnson |
| 2008/0205655 A1 | 8/2008 | Wilkins et al. |
| 2008/0273481 A1 | 11/2008 | Chang |
| 2009/0094114 A1 | 4/2009 | Rice et al. |
| 2011/0274029 A1 | 11/2011 | Connelly et al. |
| 2014/0119407 A1 | 5/2014 | Miller |
| 2014/0321294 A1 | 10/2014 | Nagel et al. |
| 2015/0007272 A1 | 1/2015 | Zou |
| 2015/0011208 A1 | 1/2015 | Terry |
| 2015/0022666 A1 | 1/2015 | Kay et al. |
| 2015/0055566 A1* | 2/2015 | Lin .................. H04W 48/20 370/328 |
| 2015/0078180 A1 | 3/2015 | Rajakarunanayake et al. |
| 2015/0327060 A1* | 11/2015 | Gilson ................ H04L 67/141 726/7 |
| 2016/0105807 A1 | 4/2016 | Yadav et al. |
| 2016/0134469 A1* | 5/2016 | Carter ................ H04L 41/0803 370/254 |
| 2016/0219631 A1 | 7/2016 | Chen et al. |
| 2016/0224960 A1 | 8/2016 | Underwood et al. |
| 2016/0295622 A1 | 10/2016 | Huang et al. |
| 2016/0302079 A1 | 10/2016 | Chari et al. |
| 2016/0302096 A1 | 10/2016 | Chari et al. |
| 2016/0316271 A1 | 10/2016 | Hajiyev et al. |
| 2017/0026902 A1 | 1/2017 | Roskind et al. |
| 2017/0070898 A1 | 3/2017 | Anderson et al. |
| 2017/0142086 A1 | 5/2017 | Chen et al. |
| 2017/0180210 A1* | 6/2017 | Lisouski ............ H04L 41/0873 |
| 2017/0195313 A1 | 7/2017 | Kirkby et al. |
| 2017/0257818 A1 | 9/2017 | Duo et al. |
| 2017/0325106 A1 | 11/2017 | Goldsmith et al. |
| 2017/0353245 A1* | 12/2017 | Vardarajan ........ H04B 7/15507 |
| 2017/0359735 A1 | 12/2017 | Jain et al. |
| 2018/0262533 A1 | 9/2018 | McCaig et al. |
| 2019/0373464 A1 | 12/2019 | Chari et al. |
| 2019/0373675 A1 | 12/2019 | Chari et al. |

OTHER PUBLICATIONS

International Search Report and Written Opinion of the International Searching Authority directed to related International Patent Application No. PCT/US2019/034873, dated Sep. 20, 2019; 10 pages.

International Preliminary Report on Patentability directed to related International Patent Application No. PCT/US2019/034876, dated Dec. 1, 2020; 5 pages.

International Preliminary Report on Patentability directed to related International Patent Application No. PCT/US2019/034873, dated Dec. 1, 2020; 6 pages.

Extended Supplementary Search Report and Opinion directed to related European Patent Application No. 19811206.2, dated Feb. 8, 2022; 8 pages.

Extended Supplementary Search Report and Opinion directed to related European Patent Application No. 19810794.8, dated Jan. 10, 2022; 9 pages.

* cited by examiner

SYSTEM AND METHOD FOR AN EXTENDER DEVICE

CROSS-REFERENCE TO RELATED APPLICATIONS

This application is a continuation application of U.S. patent application Ser. No. 15/994,382, filed on May 31, 2018, entitled, System and Method for Configuring an Extender Device, which is related to U.S. patent application Ser. No. 15/994,362, filed on May 31, 2018, entitled, Real-Time Assessment of Multimedia Service in a Particular Environment, which are incorporated herein by reference in their entireties.

BACKGROUND

Field

The described embodiments generally relate to techniques for improving multimedia service.

Related Art

A multimedia device coupled to a WiFi network may provide multimedia streaming services to a customer. When the quality of the multimedia streaming service is poor, the customer may not know what to do to improve the situation for their particular environment.

SUMMARY

Some embodiments include assessing multimedia service in a particular environment, determining in real-time whether an extender device would improve the multimedia service in the individual environment, and communicating a recommendation via a graphical user interface (GUI). The assessing is based on physical layer and application layer measurements of the multimedia service in the particular environment.

To improve their multimedia service, a customer may order a new extender device to be added to their WiFi network. Many customers have difficulty setting up new equipment in the customer premises environment. For example, a new extender device being added to their WiFi network requires corresponding network credentials (e.g., a corresponding SSID and password) to connect the new extender device to their WiFi network. Customers typically have difficulty obtaining and then entering the data correctly.

Some embodiments include configuring an extender device based on existing WiFi network credentials to minimize errors. Some embodiments include an application for mobile devices that may enable the transfer of network credentials from existing multimedia devices on the WiFi network to configure a new extender device in real time. For example, the configuration may be based on a customer account, a corresponding environment, and corresponding multimedia devices associated with the customer account. The extender device may be configured with the network credentials (e.g., a WiFi service set identifier (SSID) and password) that is common to the corresponding multimedia devices associated with the customer account.

Some embodiments include a system, method, and computer program product for configuring an extender device. Embodiments include detecting an extender device, where the extender device is unconfigured, obtaining consent to share network credentials of a customer account with the extender device, obtaining network credentials from a multimedia device associated with the network credentials, and transmitting network credentials to the extender device. To obtain consent, embodiments include establishing a connection to a service provider server of the customer account, presenting an end-user license agreement or consent agreement, an receiving consent to share the network credentials with the extender device. Embodiments also include receiving account credentials of the customer account, and transmitting the account credentials to the service provider server, where the account credentials comprise a login and password.

Prior to obtaining the network credentials from the multimedia device, some embodiments include discovering the multimedia device on a WiFi network that is associated with the customer account, and prior to transmitting the network credentials to the extender device, establishing a communication with the extender device. Embodiments also include verifying that the extender device is connected to a WiFi network that is associated with the customer account, and binding the extender device to the customer account. Some embodiments include obtaining a network topology of the home WiFi network from the extender device, and providing verification data that the extender device is connected to the home WiFi network.

To provide verification data, embodiments include presenting an image of the network topology that includes the multimedia device, the extender device, and an access point (AP) associated with the home WiFi network. To detect the unconfigured extender device, embodiments include transmitting a discovery message, and receiving a response indicating that the extender device is not configured, where the discovery message is transmitted via Bluetooth™ protocol or software enabled access point (SoftAP).

Once the extender device is configured, some embodiments utilize an application on a mobile communications device that may be used in conjunction with a multimedia device to determine placement of an extender device among multimedia devices associated with a same multimedia service customer account for a desired performance and customer experience.

Some embodiments include a system, method, and computer program product for an electronic device that recommends placement of an extender device of a multimedia service customer account. Some embodiments include, for example, detecting an extender device, obtaining network topology and one or more connection quality metrics from the extender device, first determining that a connection quality metric of the connection quality metrics satisfies a threshold, and providing instructions for placing the extender device according to the network topology and the threshold satisfied.

Embodiments further include providing a first indication for a first connection quality of an access point (AP) ↔extender device connection, and a second indication for a second connection quality of an extender device↔multimedia device connection and displaying the first indication and the second indication according to the network topology obtained. The first indication may be based on: a received signal strength indication (RSSI), a time-average of downlink SNR values, an uplink data rate, and/or a downlink data rate. Some embodiments include determining that a timer has not expired, obtaining updated connection quality metrics from the extender device, and providing an updated first indication and an updated second indication. When a timer has expired, some embodiments include receiving a placement adjustment recommendation, where the placement adjustment recommendation is based on an analysis including the connection quality metric over a longer period of time than the first determination. The one or more connection quality metrics from the extender device are associated with the multimedia service customer account and the corresponding environment. To obtain the one or more connection quality metrics some embodiments utilize Bluetooth Low Energy (BLE) protocol messaging and/or External Control Protocol (ECP) messaging.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
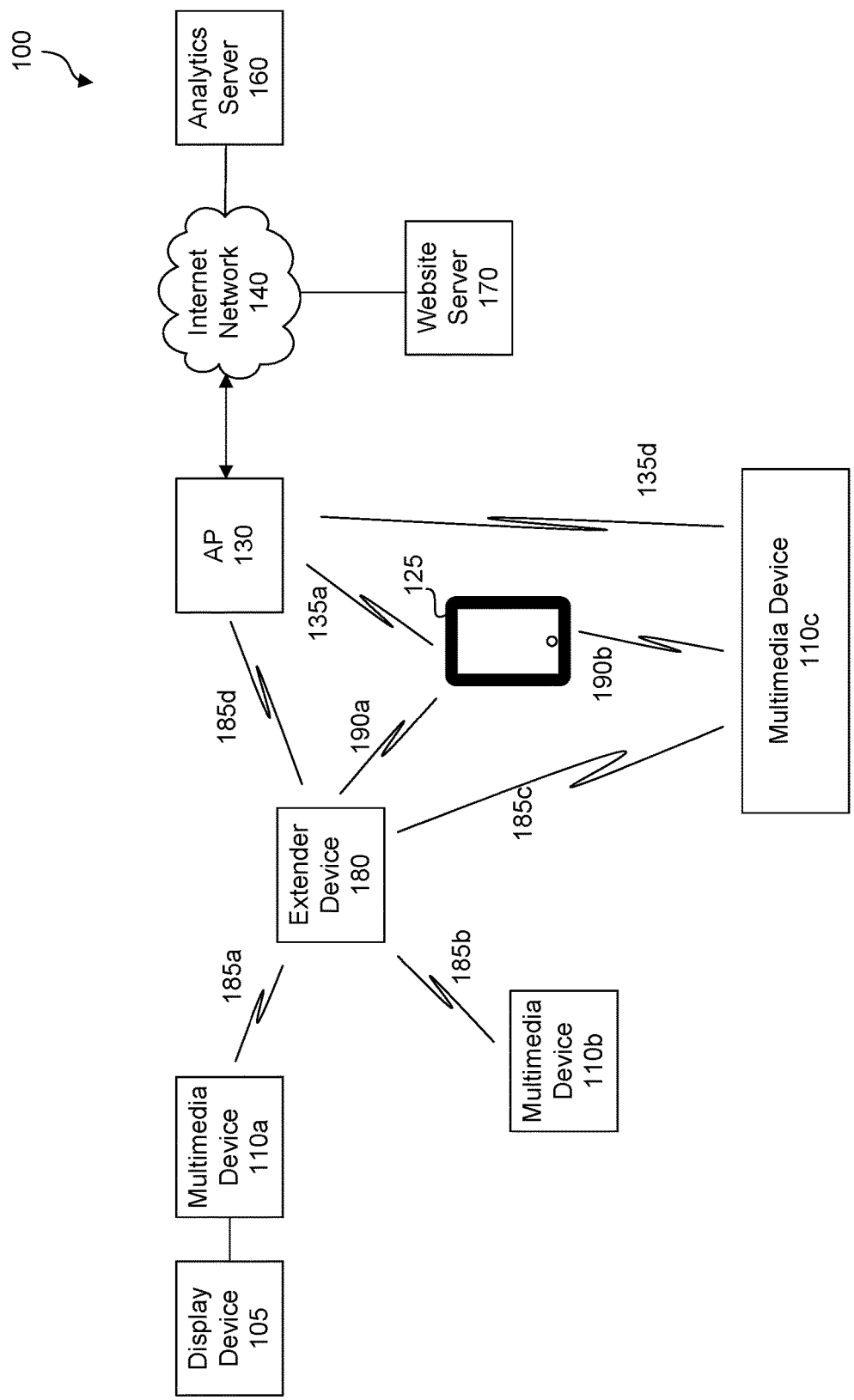
FIG. 1 illustrates an example system with electronic devices enabled to perform real-time assessment of multimedia service in a particular environment, according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Multimedia devices provide multimedia services to customer premises (e.g., a house, an office, etc.) The environment in each customer premises varies, and a customer's multimedia service experience may be dependent on the particular environment. Many customers experience poor multimedia service and are unaware and/or unable to determine how they may improve their particular environment and hence their multimedia service quality. Being able to provide environment-specific recommendations in real-time, to improve multimedia service is a challenge, especially when a plurality of multimedia devices are present in the environment.

Multimedia devices often connect to the customer's network using a wireless communications technology, such as WiFi. Wireless communications presents many challenges including obstructions such as walls and ceilings that absorb and attenuate the wireless signal, time-varying link qualities due to fading and multipath, mobility of devices and objects in the environment, and interference from other devices operating within the same frequency band. It is challenging to establish reliable communications links over short-range unlicensed radio technologies like WiFi, especially for applications such as video streaming that require reliable high-bandwidth connections.

A wireless extender is a device that extends the communication range of a first WiFi access point by acting simultaneously as a WiFi Client (802.11 Station) and a second WiFi access point (802.11 Access Point). Acting as a client, a wireless extender can connect to a first WiFi access point within the network, and acting as a second AP, the wireless extender can accept connections from other WiFi client devices. As part of the extender function, the wireless extender can receive and retransmit data frames between a WiFi client device (e.g., a laptop) and the first WiFi AP. The wireless extender may advertise service using the same Extended Service Set Identifier (ESSID) as the first WiFi AP or it may advertise WiFi service through a separate ESSID. Unlike existing wireless extender devices that work with many devices, embodiments include a wireless extender device that is directed to improve performance of particular multimedia devices associated with a user's account.

Some embodiments include a multimedia device that determines based on metrics and the particular environment where the multimedia device is operating, whether an extender device may improve the customer's multimedia service experience. The metrics may be based on physical layer metrics and/or application layer metrics measured in real-time and/or over a defined time interval. When the metrics satisfy respective configurable threshold values, embodiments include providing a recommendation to order (e.g., purchase or rent) an extender device.

After the recommendation is communicated, a customer may order a new extender device to be added to their WiFi network. For example, a new extender device being added to their WiFi network requires corresponding network credentials (e.g., a corresponding SSID and password) to connect the new extender device to their WiFi network. Customers typically have difficulty obtaining and then entering the data correctly. For example, they may not remember their network name and/or password, or may enter their network name and/or password incorrectly.

Some embodiments include receiving an order for the extender device, and configuring the extender device based on existing WiFi network credentials to minimize errors. Some embodiments include a configuration application, configuration using a user interface (UI), and/or a pre-provisioned multimedia device, a pre-configured extender device:

- configuration application: an application for mobile devices that provides a user interface to allow the user to configure an extender device by following a defined series of steps and entering in commands and information that may include passwords and settings;
- pre-provisioned multimedia device: pre-provisioning a multimedia device associated with the customer account with an identifier of the extender device ordered by the customer. The pre-provisioned multimedia device within the customer's premise may identify, authenticate, and then configure the extender device ordered when the extender device is unboxed and installed. For example, the multimedia device may may authenticate the new extender device by validating device credentials against information present in a lookup result from an online database entry;
- configuration via a user interface (UI): transferring network credentials from a multimedia device using a UI (e.g., a TV UI) to an extender device that has been ordered and delivered to the customer premise; and/or
- pre-configured extender device: pre-configuring an ordered extender device with network credentials associated with the customer account before the extender device is delivered to the customer premise.

Once a new extender device is configured (e.g., connected to the WiFi network), many customers have a difficult time determining where to physically place the configured extender device to improve their multimedia service experience. Some customers may place the configured new extender device in a sub-optimal location, resulting in poor or unreliable performance. For example, a configured new extender device is placed too far away from the WiFi AP would have a weak connection and therefore would not be able to reliably improve the connection back from the multimedia device to the AP. On the other hand, a new extender device placed too far from the multimedia device would not be able to provide reliable last-hop connectivity to the multimedia device. Some embodiments include a placement application for mobile communications devices that receives connection quality metrics from the configured extender device, and provides instructions on where to place the configured extender device.

After the extender device has been placed, one or more multimedia devices may connect to the extender device as an access point (AP). A multimedia device may determine a strongest signal received for a link and connect to a corresponding AP. But, a customer's multimedia service may still not be acceptable. Some embodiments include a multimedia device obtaining upstream and downstream connection quality measurements directly from APs (including from an extender device coupled to an AP); based on the topology, the multimedia device determines which extender device and/or AP to connect to for a desired end-to-end connection quality (e.g., a desirable multimedia service quality). Some embodiments include a multimedia device obtaining bidirectional end-to-end link quality measurements for potential paths back to the Internet connection, and selecting a preferred path among these potential paths based on link quality metrics (e.g., signal strength, signal to noise ratio, link frame error rates, link modulation levels, link retry counters), link reliability, and end-to-end performance (e.g., throughput and latency) characteristics.

Figure 14:
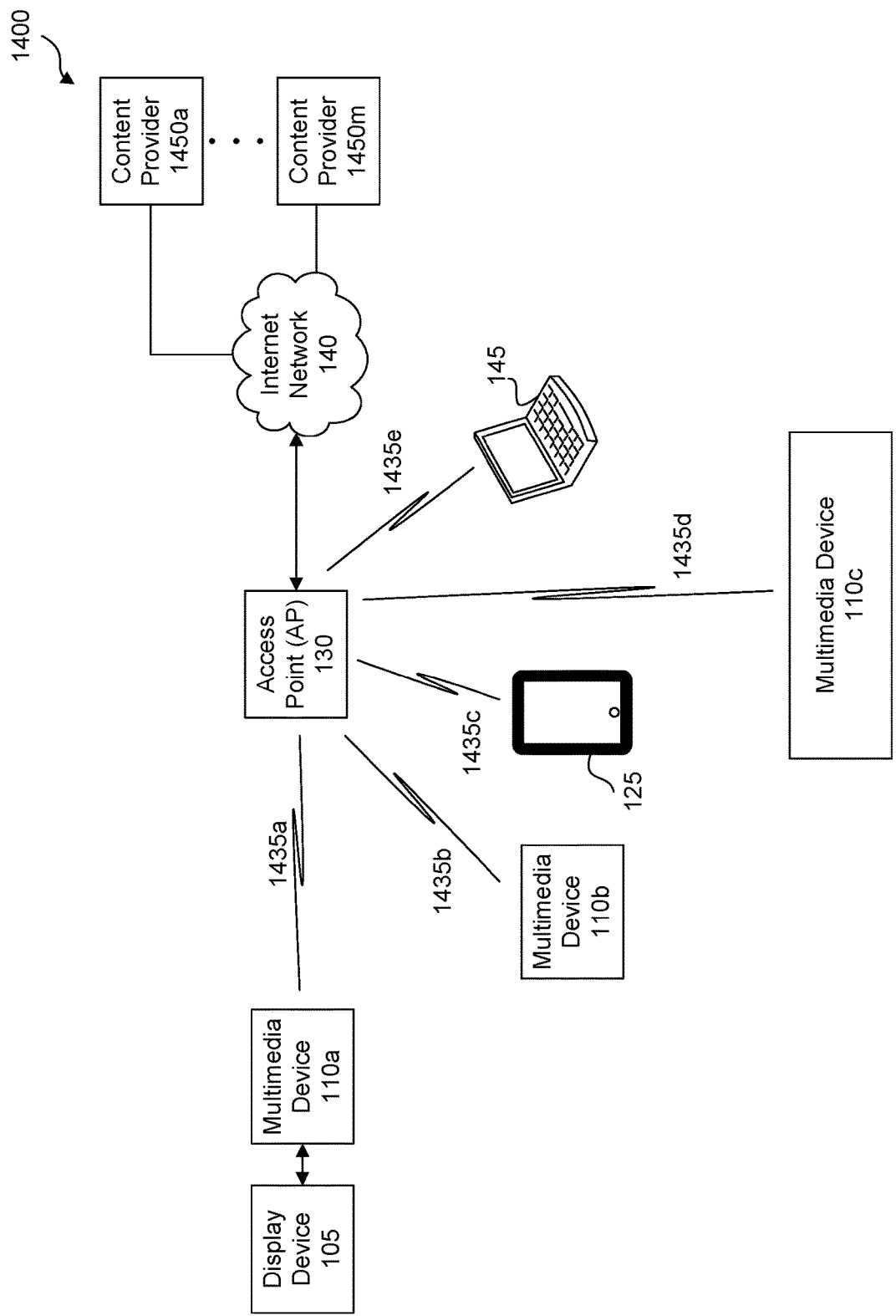
FIG. 14 illustrates an example system with electronic devices enabled to provide multimedia service in a particular environment, according to some embodiments of the disclosure.

FIG. 14 illustrates an example system 1400 with electronic devices enabled to provide multimedia service in a particular environment. Example system 1400 is provided for the purpose of illustration and is not limiting of the disclosed embodiments. System 1400 may include but is not limited to multimedia devices—such as multimedia devices 110a, 110b, and 110c, AP 130, Internet network 140, and content providers 1450. To provide multimedia service, multimedia devices 110 stream content that may be displayed on the multimedia device (e.g, multimedia device 110b and 110c) or on a display device with which a multimedia device (e.g., 110a) is communicatively coupled (e.g., display device 105). For example, multimedia device 110a may receive content in a continuous flow from content providers 1450, buffer the content received, and permit playback of the buffered content as more content are subsequently received and buffered. The playback may be viewed on display device 105 communicatively coupled to multimedia device 110a, or viewed on multimedia devices 110b and 110c that may include a display (e.g., a monitor or a TV).

AP 130 may include electronic devices such as a wireless router that communicates with WiFi stations in the extended service set (ESS). Mobile communications device 125 may include for example, a smart phone that may support Android™ or iOS™, and mobile computing device 145 may include but is not limited to a laptop, desktop, tablet, or personal digital assistant (PDA). Data may be transmitted downstream from Internet network 140 to AP 130 to multimedia devices 110, mobile communications device 125, and mobile computing device 145. Data may be transmitted upstream from multimedia devices 110, mobile communications device 125, and mobile computing device 145 to AP 130 and to internet network 140. AP 130 communicates via wireless transmissions 1435.

As an example, a customer may receive multimedia services (e.g., watch a movie on multimedia device 110b) where the movie content is provided by content provider 1450a via internet network 140, AP 130, and wireless transmission 1435b. Depending on the customer premises environment, the multimedia services received may be less than desirable quality. For example, the multimedia services may experience frequent buffering events during video streaming due to connection interruptions and link degradations. Under these conditions, many customers do not know what to do to improve their multimedia service quality.

Recommending an Extender Device

FIG. 1 illustrates an example system 100 with electronic devices enabled to perform real-time assessment of multimedia service in a particular environment, according to some embodiments of the disclosure. Example system 100 is provided for the purpose of illustration and is not limiting of the disclosed embodiments. System 100 may include but is not limited to multimedia devices 110a, 110b, and 110c, an access point (AP) 130, Internet network 140, display device 105, and mobile communications device 125 that are substantially the same as described above for system 1400. Content providers 1450 are not shown for clarity. System 100 also includes analytics server 160, website server 170, and extender device 180. Analytics server 160 may receive and store records of measurements and metrics from multimedia devices 110, extender device 180, and AP 130, and perform analysis accordingly. Website server 170 provides access customer account information including one or more multimedia devices and/or network credentials associated with the customer account. Extender device 180 may be a repeater device communicatively coupled to AP 130 that is directed to improving multimedia services for the one or more multimedia devices associated with the customer account.

Figure 2:
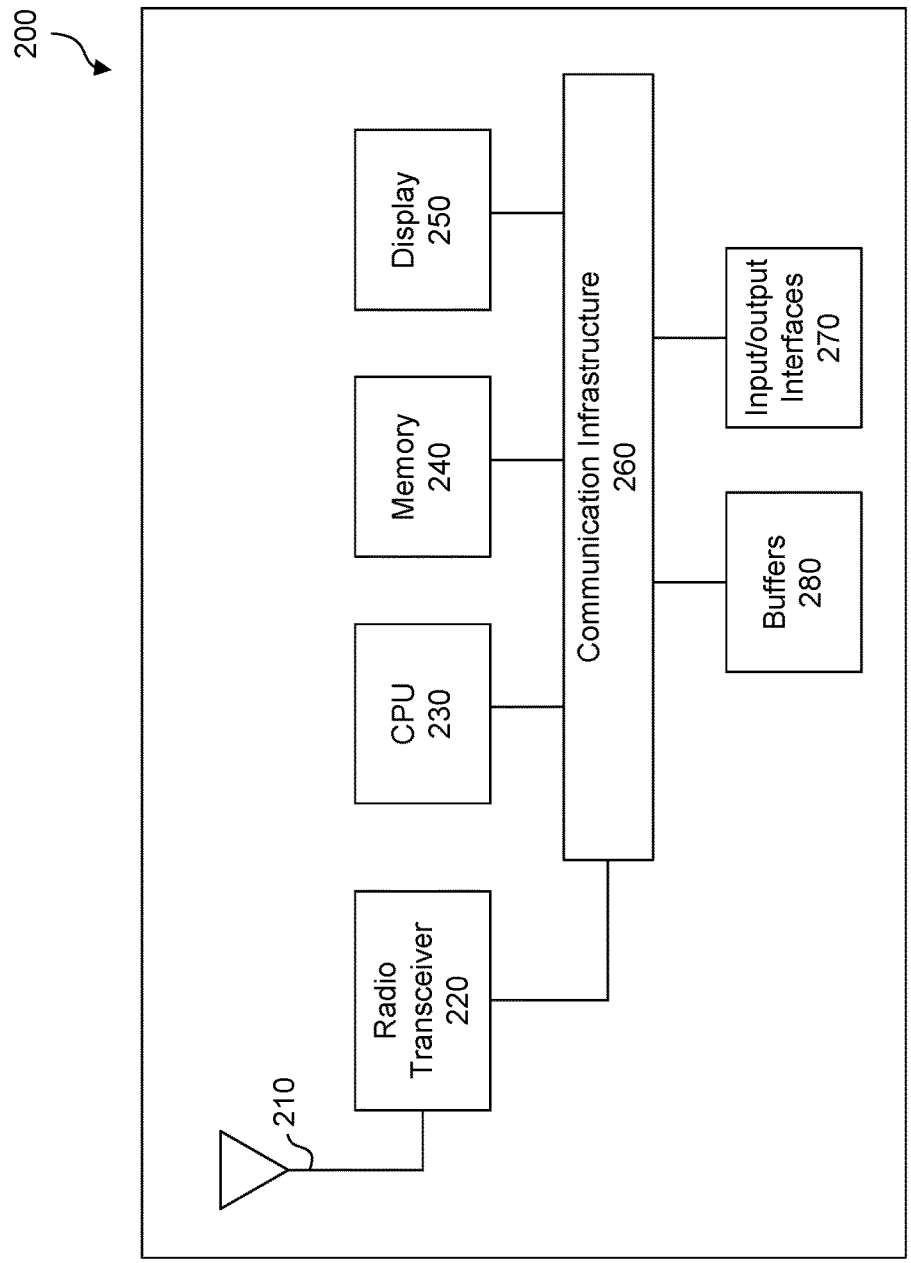
FIG. 2 illustrates a block diagram of an example system for improving multimedia service in a particular environment, according to some embodiments of the disclosure.

FIG. 2 illustrates a block diagram of an example system 200 for improving multimedia service in a particular environment, according to some embodiments of the disclosure. Examples of system 200 may include multimedia device 110, extender device 180, and mobile communications device 125.

System 200 may include an antenna 210, radio transceiver 220, central processing unit (CPU) 230, a memory 240, display 250, communication infrastructure 260, input/output interfaces 270, and buffers 280. Radio transceiver 220 may be communicatively coupled to antenna 210, and may perform WiFi transmit and receive functions. While FIG. 2 depicts a single radio transceiver communicatively coupled to a single antenna, it will be evident to one familiar with the art that there could be multiple transceivers operating over different frequency bands or channels, coupled to multiple sets of antennas. Multimedia data received via radio transceiver 220 may be stored in buffers 280. CPU 230 may include one or more processors coupled to communication infrastructure 260. Memory 240 may include random access memory (RAM) and/or cache and may include control logic (e.g., computer software) and/or data. The computer software may enable CPU 230 to determine for example, whether an extender device 180 as described above with respect to FIG. 1 may improve a multimedia service. Display 250 may be a display such as a touch-sensitive display, that presents the playback of multimedia data stored in buffers 280. Communication infrastructure 260 may be, for example, a bus or other such interconnect. Input/output interfaces 270 may include, for example, a microphone, speakers, a Universal Serial Bus (USB) interface, an Ethernet interface, an HDMI interface or combinations thereof.

To help a customer improve their multimedia service, embodiments provide environment-specific recommendations in real-time. In some embodiments a multimedia device determines based on metrics from the customer's particular environment, whether an extender device will improve the customer's multimedia service. The metrics may be based on one or more physical layer metrics and/or one or more application layer metrics. In some embodiments, a multimedia device determines whether an extender will improve the customer's multimedia service based on whether one or more of the physical layer or application layer metrics meet an eligibility threshold.

Examples of physical layer metrics include but are not limited to signal-to-noise ratio (SNR), received signal strength indicator (RSSI), link layer modulation rates, and frame error rates. Examples of application layer metrics include rebuffering rates, rebuffer counts, and streaming video quality of service (QOS). A session may be a single piece of content being streamed (e.g., a movie), or contiguous content being streamed (e.g., two movies where the time between the movies is less than a configurable threshold.)

Examples of eligibility thresholds include but are not limited to: a maximum number of rebuffering events detected during a session, a maximum number of rebuffering events detected within a period of time during a session, a maximum percentage of time spent rebuffering during a session or during a period of playback, a maximum number of rebuffering events detected within a period of time, a minimum average SNR over a period of time (e.g., 5 minutes) during a session where the period of time may be different than the period of time for detecting rebuffering events and the average may be a running average, a minimum RSSI, a minimum streaming video QOS (e.g., High Definition (HD), Ultra High Definition (UHD), and High Dynamic Range (HDR)). An eligibility threshold may also be a change in QOS (e.g., a downgraded QOS where a multimedia device may be streaming UHD QOS, then changes to transmit with a QOS of HD; a multimedia device may be streaming HDR then change to transmit with a QOS of UHD or HD).

Figure 3:
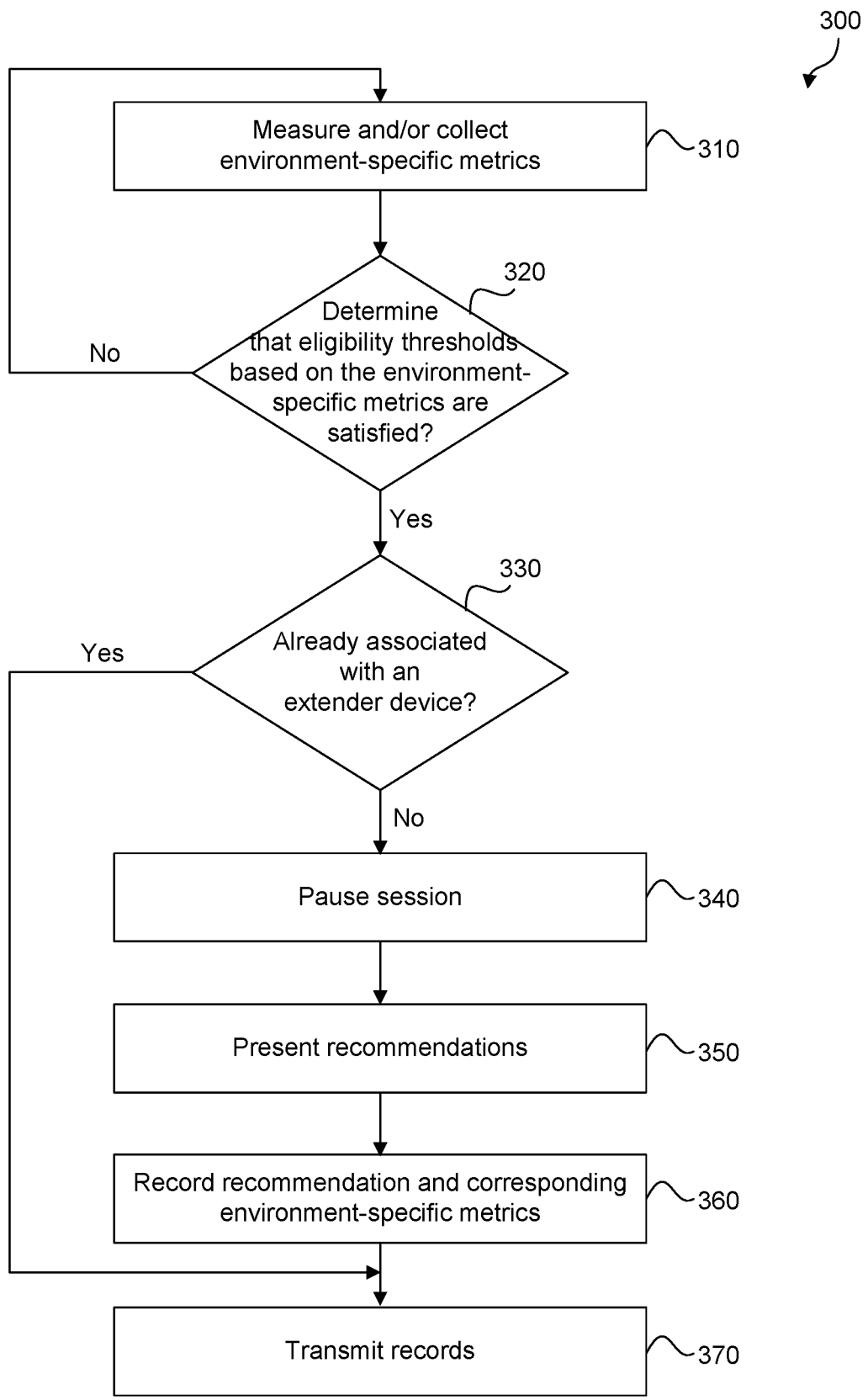
FIG. 3 illustrates an example method for real-time assessment of multimedia service in a particular environment, according to some embodiments of the disclosure.

In some embodiments, when one or more metrics satisfy their respective eligibility threshold values, the embodiments include providing a recommendation to order an extender device. In some embodiments, a recommendation is provided when a physical layer metric and an application layer metric both satisfy their respective thresholds. The one or more metrics as well as the eligibility thresholds to be satisfied may depend on the type of multimedia device providing the recommendation. FIG. 3 illustrates an example method 300 for real-time assessment of multimedia service in a particular environment, according to some embodiments of the disclosure. For explanation purposes, example method 300 may be described with elements from previous figures. Examples of system 200 that may perform method 300 include but are not limited to multimedia devices 110. Based on the description herein, other systems may perform the operations of method 300; these other systems are within the spirit and scope of the disclosure. It is to be appreciated that not all operations may be needed to perform the disclosure provided herein. Further, some of the operations may be performed simultaneously or in a different order than shown in FIG. 3.

At 310, system 200 measures and/or collects environment-specific metrics. As described earlier, the environment-specific metrics may include physical layer metrics and/or application layer metrics. Some examples of application layer metrics as well as physical layer metrics are shown below:

Example application layer metrics include but are not limited to the following:
  Number of rebuffering events during a session, or over a defined period of time
  Number of rebuffering events per unit time during a session or over a defined period of time
  Fraction of time spent rebuffering, defined as time spent rebuffering divided by the total play time
  Average and instantaneous streaming bitrate during a session
  Streaming quality (e.g., SD vs HD)
  Changes in QoS—e.g., quality degradation from 4K to HD
  Video start time, defined as time interval between the user hitting "Play" and the start of video playback
  Number of video start failures during a defined period of time Example physical layer metrics include but are not limited to the following:
  Received signal strength indicator (RSSI), averaged over a defined period of time
  Received Signal to Noise Ratio (SNR), averaged over a defined period of time Packet Success Rate, defined as the percentage of packets that are successfully received, on a given link. Packet Error Rate (PER)=(100−Packet Success Rate)

End-to-end wireless packet success rate, measured over an end-to-end path within the wireless LAN from the multimedia device to a home WiFi router, by sending a predetermined number of ping or arp packets, and counting the number of responses received.

Wireless data rate, averaged over a defined period of time, by taking the average of the physical layer bit rate selected by the transmitter. Wireless data rate can be measured at the transmitter, or the receiver, or both Percentage of frames that needed to be retransmitted Average number of transmissions per frame (including original transmission and retransmissions)

Noise level on the current channel

Airtime utilization on the current wireless channel

At 320, system 200 determines whether eligibility thresholds based on the environment-specific metrics are satisfied. For example, system 200 may determine whether one or more eligibility thresholds described above are satisfied, where satisfied may mean exceeded, equal to, or below. When system 200 determines that one or more eligibility thresholds are not satisfied, method 300 returns to 310. When system 200 determines that one or more eligibility thresholds are satisfied, then the multimedia service may be improved by adding a new extender device and method 300 proceeds to 330. For example, system 200 may determine that when a number of rebuffering events during a session satisfies a first threshold (e.g., exceeds the first threshold value) and a received SNR averaged over a defined period of time satisfies a second threshold (e.g., is less than the second threshold value), then the eligibility thresholds (e.g., the first and second thresholds) based on the environment-specific metrics (e.g., rebuffering events and received SNR) are satisfied. The first and second threshold values may be different.

At 330, system 200 determines whether system 200 is already associated with an extender device. When system 200 determines that an extender device is already present, then method 300 proceeds to 370. When system 200 determines that an extender device is not present, method 300 proceeds to 340. In some embodiments system 200 proceeds to step 340 when the current channel is listed in an inclusion list or not listed in an exclusion list of system 200.

At 340, system 200 may pause the session (e.g., pause the playback of the multimedia service.)

At 350, system 200 presents a recommendation in real-time (e.g., on display 250) or provides a recommendation to display device 105. The recommendation may be via a heads up display (HUD) on display 250 (or provided to display device 105). In an embodiment, the recommendation may be provided on a separate recommendation screen on the display device. The recommendation may include a URL link to website server 170 so that a customer may place an order for a new extender device (e.g., extender device 180.) The HUD and/or website server 170 may present network status, diagnostics, and recommendations in a comprehensible visual form that depicts how the multimedia devices 110 are performing in the WiFi network, and what actions may be taken to improve WiFi network and/or multimedia device 110 performance (e.g., adding an extender device 180 to the WiFi network). The recommendation may provide information about extender device 180, as well as instructions on how to place an order for extender device 180, including shipping. The one or more metrics as well as the eligibility thresholds to be satisfied may depend on the type of multimedia device providing the recommendation. In another embodiment, the recommendation message may be a persistent message that may be accessible by a user at a later time—in for example, a settings menu of the multimedia device.

At 360, system 200 records the recommendation, one or more metrics that are environment-specific metrics, and/or order information for extender device 180.

At 370, system 200 transmits the records to analytics server 160. In some embodiments, analytics server 160 may receive and analyze physical layer and application layer metrics from multimedia devices 110 and/or AP 130 and determine whether to provide a non-real-time recommendation to a customer (e.g., via website server 170) which may result in a recommendation via email to the customer or via an ad banner on a home screen of the multimedia device. Analytics server 160's determination may include metrics such as an average number of rebuffering events per hour of streaming, e.g., (total rebuffer count over the last N days)/(total streaming hours over the last N days)>rebuffersPerHour Threshold, where N=analysisDuration. The metrics may also include a low average SNR computed as a running average of SNR measurements over a period of at least one week. For example, a running average of SNR (over analysisDuration days)<analysisSnrThrshold), where the analysisSnrThrshold may be 15 dB, the analysisDuration may be 7 days, and rebuffersPerHourThreshold may be 3. The metrics and eligibility thresholds may depend on the type of multimedia device.

In another embodiment when system 200 is already associated with an extender device and one or more of the environment-specific metrics are satisfied (e.g., a number of rebuffers in a session satisfies a third threshold value), system 200 may provide a recommendation for changing a placement of the extender device. This may be via a HUD on display 250 (or provided to display device 105), or a persistent message that may be accessible by a user at a later time in for example, a settings menu of the multimedia device. In an embodiment, system 200 may provide a recommendation to an application on mobile communications device 125.

After the recommendation is communicated, a customer may place an order for extender device 180 to be added to their WiFi network.

Many customers have difficulty setting up new equipment in the customer premises environment. For example, adding extender device 180 to their WiFi network requires the network credentials (e.g., SSID and password). Customers typically have difficulty obtaining the network credentials and/or entering the network credentials correctly.

Configuring an Extender Device

Some embodiments include receiving an order for extender device 180, and configuring extender device 180 based on existing WiFi network credentials to minimize errors. Embodiments may include a configuration application, a pre-provisioned multimedia device, configuring via a user interface (UI), and/or a pre-configured extender device which are described further below.

Configuration Application

Embodiments may include an application for mobile devices that may enable the transfer of network credentials from existing multimedia devices on the WiFi network to configure a new extender device in real time. For example, the configuration may be based on a customer account, a corresponding environment, and corresponding multimedia devices associated with the customer account. The extender device may be configured with the network credentials (e.g., a WiFi service set identifier (SSID) and password) that is common to the corresponding multimedia devices associated with the customer account.

Figure 4:
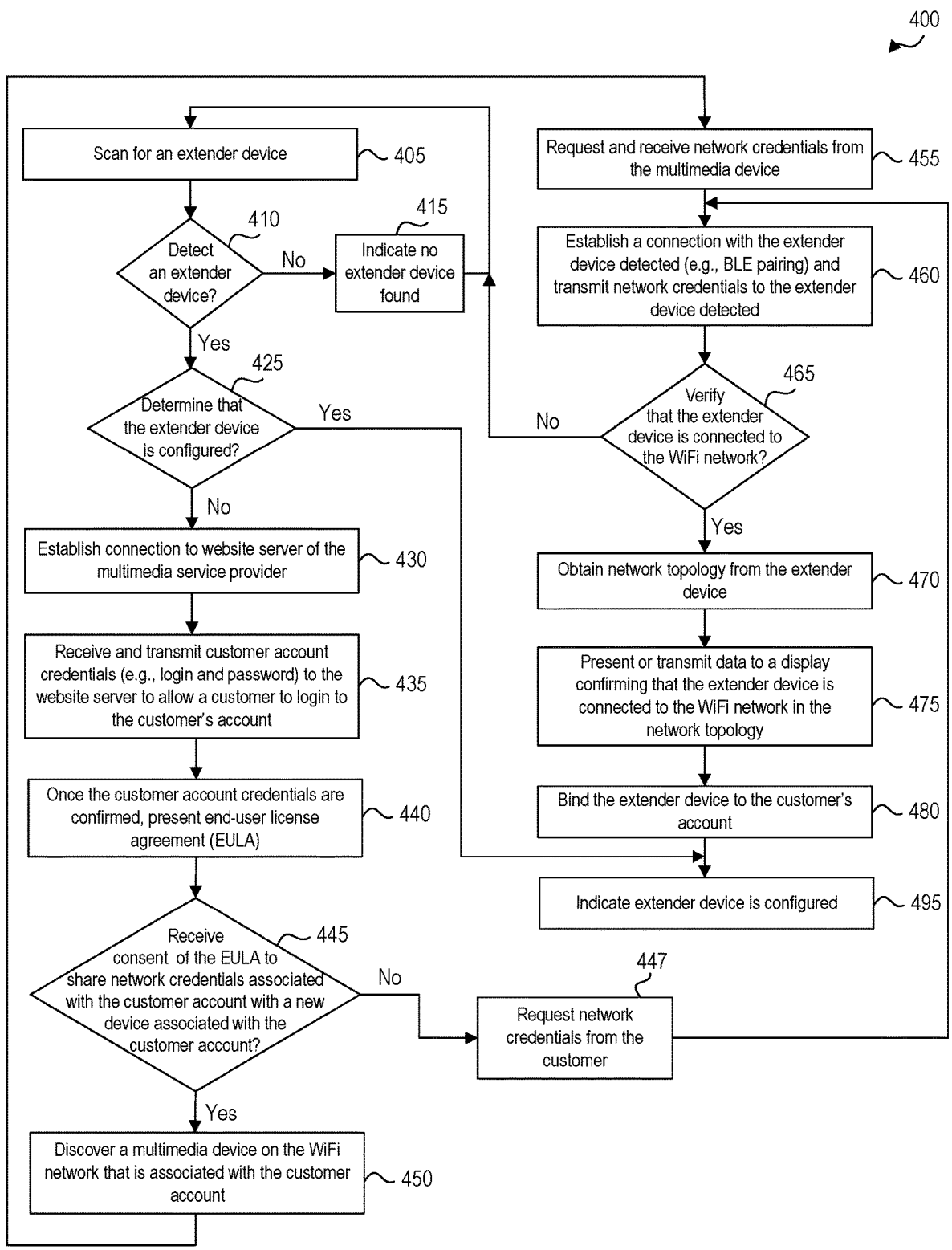
FIG. 4 illustrates an example method for configuring an extender device, according to some embodiments of the disclosure.

FIG. 4 illustrates an example method 400 for configuring an extender device 180, according to some embodiments of the disclosure. For explanation purposes, example method 400 may be described with elements from previous figures. Examples of system 200 that may perform method 400 include but are not limited to mobile communications device 125. Based on the description herein, other systems may perform the operations of method 400; these other systems are within the spirit and scope of the disclosure. It is to be appreciated that not all operations may be needed to perform the disclosure provided herein. Further, some of the operations may be performed simultaneously or in a different order than shown in FIG. 4.

For example, a customer may download a configuration application onto mobile communications device 125, and mobile communications device 125 may connect to the WiFi network via 135a, where the WiFi network includes one or more multimedia devices 110. When extender device 180 is unboxed and installed, the customer may be instructed (e.g., via a quick start guide (QSG) and/or the configuration application) to place extender device 180 near (e.g., in the same room as) AP 130 so that extender 180 may connect to the WiFi network (e.g., via 185d). Further, mobile communications device 125 may be in proximity to extender device 180 and communicate with extender device 180 via 190a, where the proximity is sufficient to support Bluetooth® Low Energy (BLE) communications or WiFi communications.

At 405, system 200 scans for an extender device. For example, mobile communications device 125 scans for extender device 180 using BLE or WiFi SoftAP connection for discovery/detection of extender device 180.

At 410, when system 200 does not detect an extender device, method 400 proceeds to 415. When system 200 detects extender device 180, method 400 proceeds to 425.

At 415, system 200 provides an indication that no extender device is found. For example, the indication may appear on display 250 or display device 105, depending on the type of the one or more multimedia devices 110. Method 400 returns to 405.

At 425, when system 200 determines that extender device is configured, method 400 proceeds to 495. When system 200 determines that extender device is unconfigured, method 400 proceeds to 430.

At 430, system 200 establishes a connection to website server 170 of the multimedia service provider associated with the one or more multimedia devices 110 associated with AP 130. The connection is established over the home WiFi network that system 200 is connected to.

At 435, system 200 may prompt the customer to login to their customer account associated with the multimedia service provider. System 200 may receive the customer account credentials (e.g., login and password) from input/output interfaces 270 and/or display 250. System 200 may transmit the customer account credentials to website server 170 of the multimedia service provider.

At 440, system 200 confirms the customer account credentials and presents an end-user license agreement (EULA) or a consent agreement on display 250 (or display device 105) and/or input/output interfaces 270. The customer's consent to the EULA or the consent agreement authorizes the network credentials (e.g., WiFi network name and password) known by the one or more multimedia devices 110 to be shared with extender device 180 to configure extender device 180.

At 445, when system 200 receives consent of the EULA that allows the network credentials known by the one or more multimedia devices 110 to be shared with new devices associated with the customer account such as the unconfigured extender device 180, method 400 proceeds to 450. When system 200 does not receive consent of the EULA, method 400 proceeds to 447. System 200 records (e.g., logs EULA consent/decline events).

At 447, system 200 requests network credentials from the customer. For example, system 200 may present on display 250 (or display device 105) and/or input/output interfaces 270, a request for SSID and corresponding password to proceed. The customer may provide the network credentials accordingly (e.g., via a touchscreen on display 250/display device 105 and/or a microphone or a camera associated with input/output interfaces 270.) Method 400 proceeds to 460.

At 450, system 200 discovers a multimedia device 110 of the one or more multimedia devices 110 associated with the same WiFi network that system 200 is connected to. For example, system 200 may use simple service discovery protocol (SSDP) to discover a multimedia device 110 on the WiFi network associated with the SSID. System 200 may use SSDP, External Control Protocol (ECP), and/or another protocol to determine the customer account ID of each of the discovered multimedia devices 110 to confirm that the discovered multimedia device 110 is associated with the customer account. Likewise, a discovered multimedia device 110 may use ECP to ensure that system 200 is associated with the customer account. System 200 may also log the multimedia devices 110 discovered through SSDP discovery, and the multimedia device 110 information obtained through secure ECP messaging including but not limited to: multimedia device ID, electronic serial number (ESN), customer account ID, SSID, and/or a password.

At 455, system 200 requests and receives WiFi network credentials from one or more of the multimedia devices 110 associated with the customer account. For example, system 200 may use secure ECP messaging to request network credentials (e.g., the SSID and corresponding password) from the one or more multimedia devices 110 that are associated with the customer account. The secure ECP messaging may include but is not limited to authentication, authorization, encryption, and/or Hyper Text Transfer Protocol Secure (HTTPS). In some embodiments, the WiFi network credentials are further encrypted before being transmitted to system 200.

At 460, system 200 establishes a connection with extender device 180 detected at 410 and transmits network credentials to extender device 180. For example, system 200 may pair with extender device 180 via 190a using a BLE protocol, or system 200 may scan for a SoftAP SSID of extender device 180 to establish the connection via 190a. Note that the SoftAP SSID is different than the SSID that corresponds to of the WiFi network. Once the connection is established, system 200 may transmit the network credentials to extender device 180. In some embodiments, system 200 transmits encrypted network credentials to extender device 180.

At 465, system 200 verifies whether external device 180 is connected to the WiFi network (e.g., the SSID identified in the network credentials) and that extender device 180 and one or more multimedia devices 110 (e.g., 110c) are on the same WiFi network. In an example, system 200 may use a multicast protocol to discover other devices on the wireless LAN and to obtain an IP address of extender device 180 along with IP addresses of other multimedia devices on the wireless LAN. System 200 may then use ECP messaging to query the IP addresses and determine whether one of them corresponds to the extender device 180 by examining the ESN of each device and determining which one matches the ESN of the extender device 180. When system 200 successfully communicates via ECP messaging to extender device 180, this verifies that extender device 180 is communicatively coupled to the WiFi network. In another embodiment, system 200 may successfully ping the IP address of extender device 180, and thereby verify that extender device 180 is communicatively coupled to the WiFi network. When system 200 verifies that extender device 180 is connected to the WiFi network, method 400 proceeds to 470. When system 200 verifies that external device 180 is not connected to the SSID, system 400 returns to 405. System 200 logs the connection verification including a timestamp and may transmit the log records to analytics server 160.

At 470, system 200 obtains network topology from extender device 180 where the network topology indicates whether one or more multimedia devices 110 are coupled to extender device 180 or directly to AP 130. For example, system 200 transmit a request for and receive network topology data. System 200 logs the network topology including a timestamp and may transmit the log records to analytics server 160.

At 475, system 200 presents or transmits data to display 250 (or display device 105) confirming that extender device 180 is connected to the WiFi network in the network topology. For example, the data may include a visual display of the network topology such as AP 130↔multimedia device 110c or AP 130↔extender device 180↔multimedia device 110c.

At 480, system 200 binds extender device 180 to the customer account. For example, system 200 may transmit data to website server 170 and/or analytics server 160 indicating that extender device 180's ESN is now associated with the customer account ID. For example, extender device 180 may download any firmware updates available and determine whether the firmware update is to be applied immediately or at a later time.

At 495, system 200 may indicate that extender device 180 is in a configured state.

Figure 5:
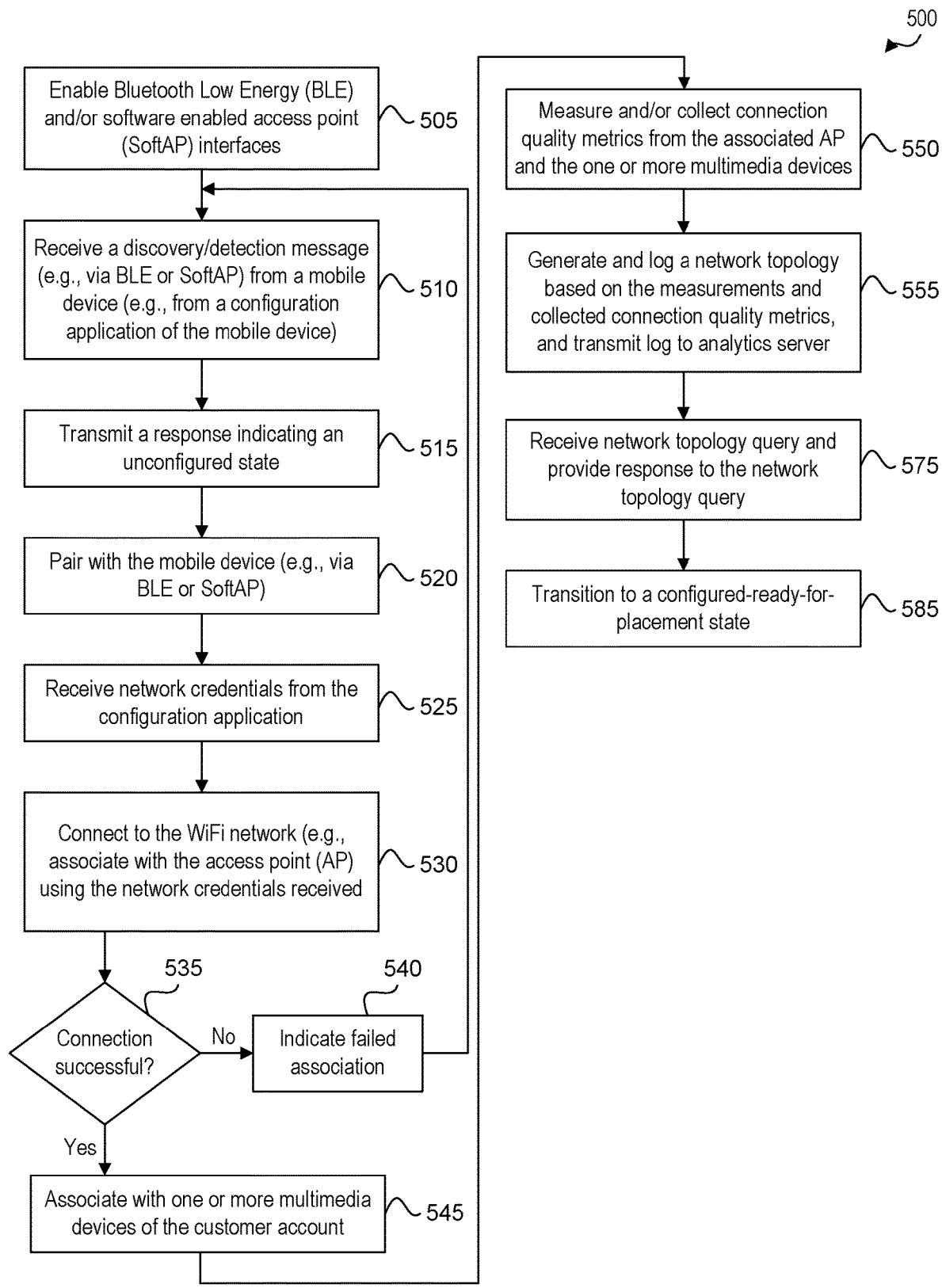
FIG. 5 illustrates an example method for an extender device to be configured, according to some embodiments of the disclosure.

FIG. 5 illustrates an example method 500 for an extender device 180 to be configured, according to some embodiments of the disclosure. For explanation purposes, example method 500 may be described with elements from previous figures. Examples of system 200 that may perform method 500 include but are not limited to extender device 180. Based on the description herein, other systems may perform the operations of method 500; these other systems are within the spirit and scope of the disclosure. It is to be appreciated that not all operations may be needed to perform the disclosure provided herein. Further, some of the operations may be performed simultaneously or in a different order than shown in FIG. 5.

At 505, system 200 enables BLE and/or SoftAP interfaces. For example, system 200 may be unboxed and powered. Once powered, system 200 may enable interfaces for BLE and/or SoftAP protocols.

At 510, system 200 receives a discovery/detection message (e.g., via BLE or SoftAP) from a mobile communications device 125 (e.g., from a configuration application of mobile communications device 125.) See 405 above.

At 515, system 200 transmits a response indicating an unconfigured state. See 425 above.

At 520, system 200 pairs with mobile communications device 125 (e.g., via BLE or SoftAP). See 460 above.

At 525, system 200 receives network credentials from a configuration application on mobile communications device 125. See 460 above. System 200 may enable simple service discovery protocol (SSDP) and/or external control protocol (ECP). In an example, system 200 may turn off BLE and/or SoftAP interfaces.

At 530, system 200 connects to the WiFi network (e.g., associates with AP 130) using the network credential received, where the connection may be communicatively coupled via 185d.

At 535, system 200 may assist in the verification of whether the connection to the Wifi network (e.g., verification that system 200's association with AP 130 on the WiFi network) was successful. For example, system 200 may provide responses to queries for system 200's IP address via BLE protocol on 190a, and/or system 200's IP address via 185d where the queries may be via secure ECP messaging. In addition, system 200 may respond to pings. See 465 above. When system 200 (e.g., extender device 180) provides an IP address in response to a query, the WiFi connection is successful and method 500 proceeds to 545. When system 200 does not receive a query or a ping and/or does not respond with a corresponding IP address, the WiFi connection is unsuccessful and method 500 proceeds to 540.

At 540, system 200 provides an indication that the WiFi connection 185d or the association with AP 130 failed. The indication may be a message transmitted via 190a using BLE or SoftAP protocol to a configuration application on mobile communications device 125 that may be displayed and/or audible. Method 500 returns to 510.

At 545 when the WiFi connection 185d is successful, system 200 associates with one or more multimedia devices 110 of the customer account via 185a-185c. For example, system 200 (e.g., extender device 180) may function as an AP and one or more multimedia devices 110 may associate with system 200. For example, multimedia devices 110a, 110b, and 110c may associate with system 200 to access the WiFi network.

At 550, system 200 measures and/or collections connection quality metrics from AP 130, the associated AP, and the one or more multimedia devices 110 that are associated with system 200. The measurements and/or collections may take place periodically, on demand, and/or after a power-up. System 200 may record the measurements and/or collections and transmit records logged to analytics server 160.

At 555, system 200 generates and logs a network topology based on the measurements and collected quality metrics. System 200 may transmit the record logs to analytics server 160.

At 575, system 200 receives a query for a network topology and provides a response to the query based on the measurements and/or collections at 550. See 470 above.

At 585, system 200 transitions to a configured-ready-for-placement state.

Pre-Provisioned Multimedia Device

Some embodiments include pre-provisioning a backend database entry associated with the customer account with a serial number of the extender device that is ordered via website server 170. For example, a purchase through website server 170 may bind the extender device ordered to the customer account (e.g., associate the extender device's ESN with the customer account ID). In an embodiment, the transaction identifier for the purchase transaction is associated to the account identifier of the purchaser through a database entry. When the extender device is shipped from a fulfillment center, the ESN of the extender device is associated to the transaction identifier through a database entry. As a result, the account identifier is associated to the extender device's ESN through a database entry. Multimedia devices in a customer's premise may detect the extender device when the extender device is unboxed and powered up.

Figure 6:
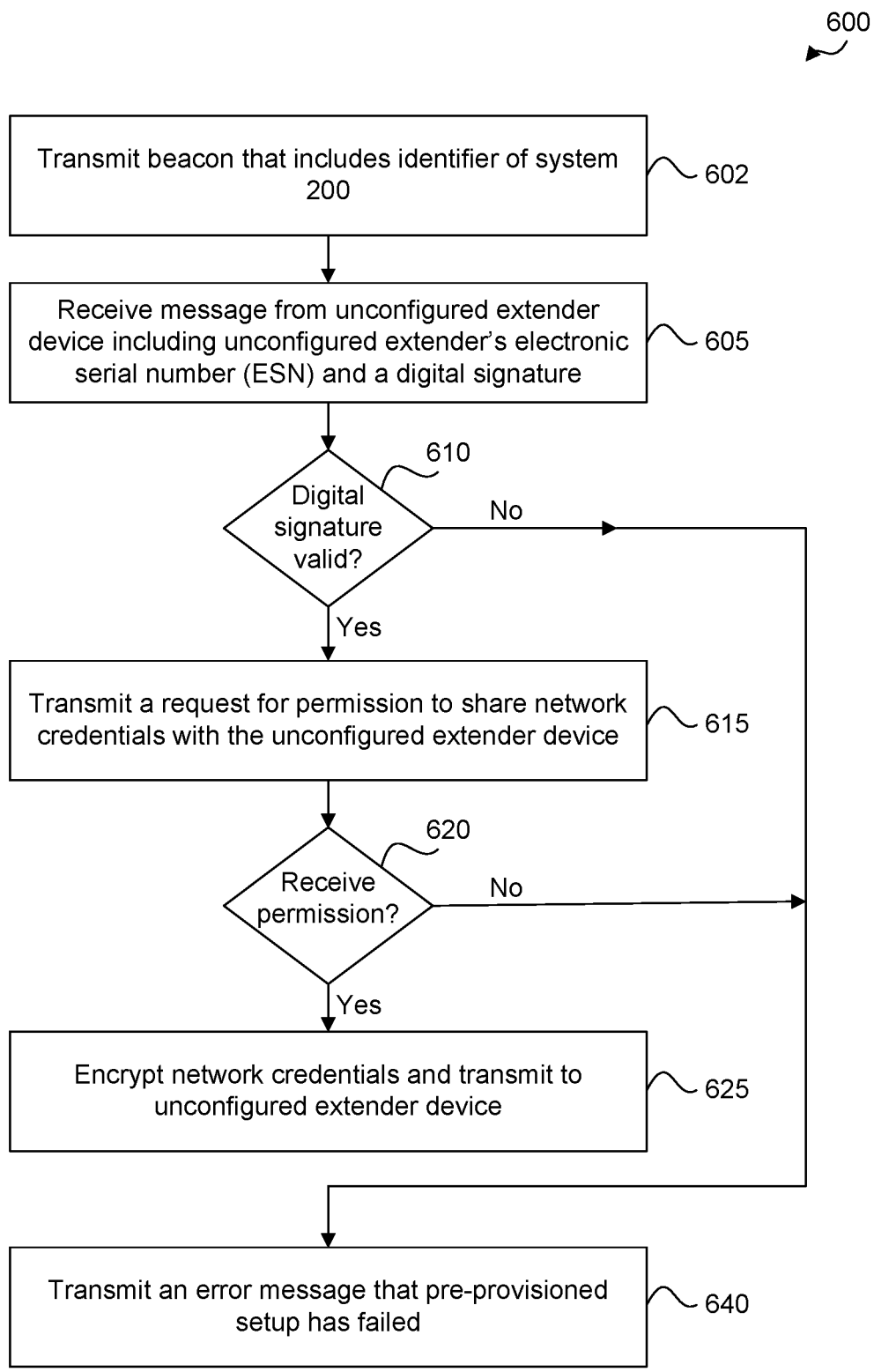
FIG. 6 illustrates an example method for a pre-provisioned multimedia device, according to some embodiments of the disclosure.

FIG. 6 illustrates an example method 600 for a multimedia device 110, according to some embodiments of the disclosure. For explanation purposes, example method 600 may be described with elements from previous figures. Examples of system 200 that may perform method 600 include but are not limited to multimedia devices 110. Based on the description herein, other systems may perform the operations of method 600; these other systems are within the spirit and scope of the disclosure. It is to be appreciated that not all operations may be needed to perform the disclosure provided herein. Further, some of the operations may be performed simultaneously or in a different order than shown in FIG. 6.

At 602, system 200 transmits a beacon of a peer-to-peer (P2P) protocol (e.g., WiFi Direct) that may include an identifier of system 200 (e.g., a BSSID, ESSID, and/or a media access control (MAC) address of the multimedia device.)

At 605, system 200 receives a request message for network credentials from an unconfigured extender device 180, and the request message may be signed using an asymmetric key (K_priv) of a public-private key pair of unconfigured extender device 180. The request message may contain an ESN of the unconfigured extender device 180, a MAC address of a target network, a randomly generated Nonce, and/or a digital signature (e.g., created using SHA256 hashing algorithm/RSA2048 signing algorithm). The MAC address of the target network may correspond to a WiFi radio interface (e.g., a WiFi Direct Interface) of system 200.

In an embodiment, the message exchange between system 200 and the unconfigured extender device 180 may be performed over a P2P WiFi or a WiFi Direct connection. In another embodiment, system 200 and the unconfigured extender device 180 may perform the message exchange using an IP-based protocol between temporarily-allocated IP addresses. For example, system 200 may assign itself an IP address, such as 10.0.0.1, and system 200 may operate a DHCP server to assign IP addresses in the range 10.0.0.2-10.0.0.100. Through the DHCP protocol, the unconfigured extender device 180 may request and receive an IP address, such as 10.0.0.3. System 200 and unconfigured extender device 180 may then communicate using an IP-based protocol, such as hyper text transfer protocol (HTTP), between corresponding IP addresses 10.0.0.1 and 10.0.0.3.

At 610, system 200 may validate the digital signature received using the public key, K_pub, corresponding to private key, K_priv. When the digital signature is invalid, method 600 proceeds to 640. When the digital signature is valid, method 600 proceeds to 615.

At 615, system 200 may transmit a request for permission to share WiFi credentials with unconfigured extender device 180. The permission request message may contain the ESN of unconfigured extender device 180, and/or the user account associated with system 200. A web service (e.g., website server 170) may receive the permission request and determine whether the ESN of unconfigured extender device 180 has been pre-provisioned into the user account associated with system 200.

At 620, a determination is made as to whether a corresponding database entry exists containing the ESN of unconfigured extender device 180 associated with the user account associated with system 200. When the corresponding database entry exists, system 200 may receive a message from the web service indicating that permission to share WiFi credentials to extender 180 is granted, and method 600 proceeds to 625. Otherwise, (e.g., when a corresponding database entry does not exist) system 200 may receive a message from the web service (e.g., website server 170) indicating that permission to share WiFi credentials with unconfigured extender device 180 is not granted, and method 600 proceeds to 640.

At 625, system 200 may encrypt the WiFi credentials with unconfigured extender device 180's public key, K_pub, and transmit them to unconfigured extender device 180. For example, system 200 may utilize WiFi Direct to transmit information to unconfigured extender device 180. Extender device 180 may receive and decrypt the WiFi credentials using its private key, K_priv. Extender device 180 may then use these WiFi credentials (SSID and pass phrase or password) to connect to the user's home WiFi network.

At 640, system 200 may transmit an error message to unconfigured extender device 180 indicating that pre-provisioned setup has failed.

Figure 7:
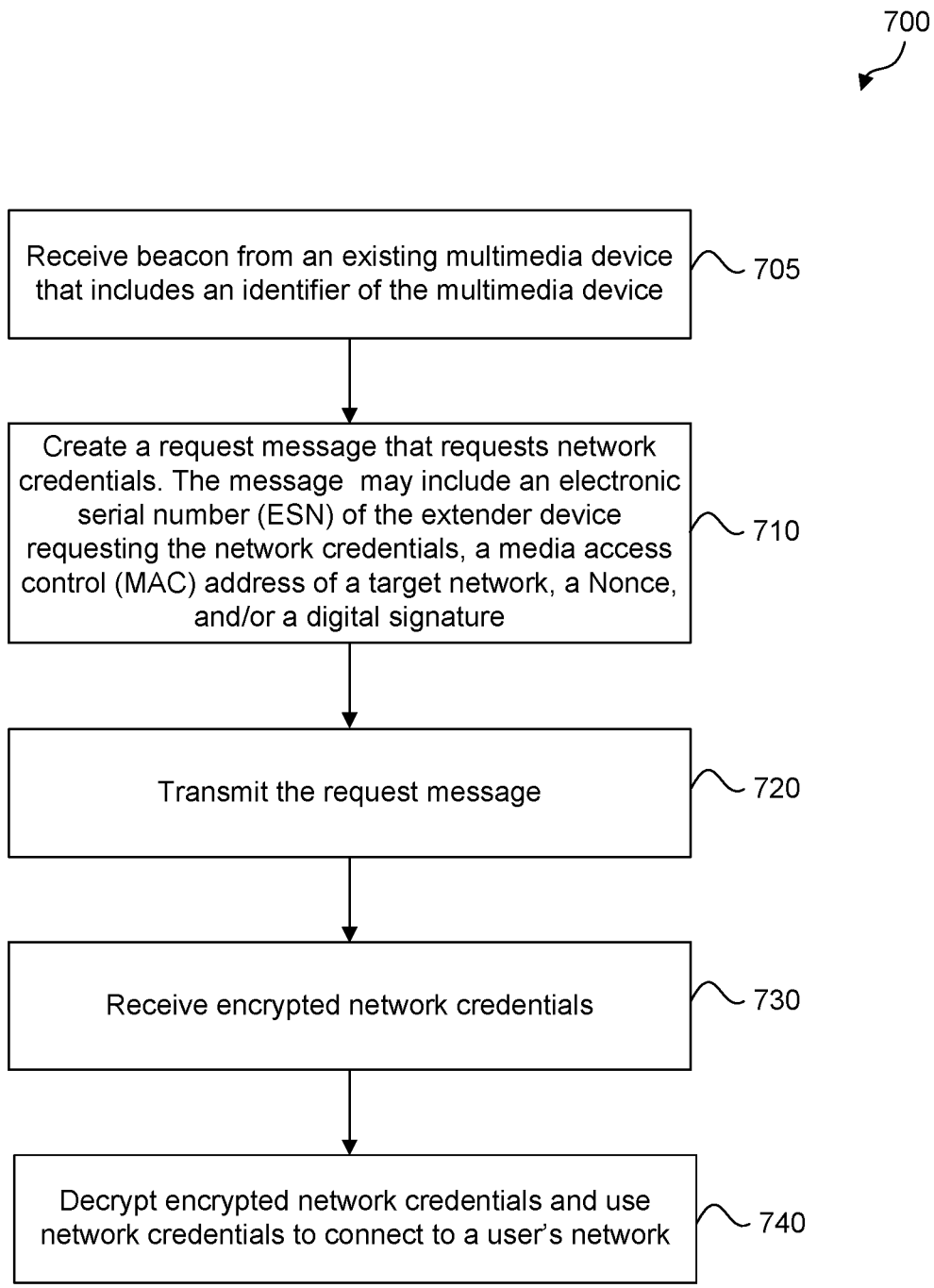
FIG. 7 illustrates an example method for communicating with a pre-provisioned multimedia device, according to some embodiments of the disclosure.

FIG. 7 illustrates an example method 700 for communicating with a pre-provisioned multimedia device 110, according to some embodiments of the disclosure. For explanation purposes, example method 700 may be described with elements from previous figures. Examples of system 200 that may perform method 700 include but are not limited to extender device 180. Based on the description herein, other systems may perform the operations of method 700; these other systems are within the spirit and scope of the disclosure. It is to be appreciated that not all operations may be needed to perform the disclosure provided herein. Further, some of the operations may be performed simultaneously or in a different order than shown in FIG. 7.

At 705, system 200 receives a beacon of a P2P protocol (e.g., WiFi Direct) from one or more existing multimedia devices that include an identifier of the respective existing multimedia device (e.g., a BSSID, ESSID, and/or a media access control (MAC) address of the multimedia device) and determines corresponding received signal strength indicators (RSSI.) If more than one multimedia device 110 is detected, system 200 may sequentially attempt to connect to the multimedia device associated with the strongest RSSI and proceed accordingly until network credentials are obtained or the attempts exceed a time limit.

At 710, system 200 creates a request message (e.g., a Provision Discovery Request) to obtain network credentials to join the network of the respective multimedia device 110. The request message may be signed using an asymmetric key (K_priv) of a public-private key pair. The request message may contain an ESN of system 200 (the unconfigured extender device 180), a MAC address of a target network, a randomly generated Nonce, and/or a digital signature (e.g., created using SHA256 hashing algorithm/RSA2048 signing algorithm). The MAC address of the target network may correspond to a WiFi radio interface (e.g., a WiFi Direct Interface) of multimedia device 110.

At 720, system 200 transmits the request message to multimedia device 110. The request message may be a P2P message (e.g., WiFi direct) from unconfigured extender device 180 to multimedia device 110.

At 730, system 200 receives a response to the request message (e.g., a Provision Discovery Response). The response includes network credentials (e.g., WiFi credentials encrypted with unconfigured extender device 180's public key, K_pub) from multimedia device 110. For example, system 200 may utilize WiFi Direct to receive information from multimedia device 110.

At 740, system 200 decrypts the WiFi credentials using its private key, K_priv. System 200 may then use these WiFi credentials (SSID and pass phrase or password) to connect to the user's home WiFi network.

Configuration Via a User Interface (UI)

Some embodiments include transferring network credentials from a multimedia device using a UI (e.g., a TV UI) to an extender device that has already been ordered and delivered to the customer premise. In this embodiment, a multimedia device may detect the extender device, request an access code that correlates to the extender device that is associated with the customer account, receive the access code, compare with a stored access code, and when a threshold is satisfied, encrypt the network credentials and transmit them over the air to the extender device to configure the extender device. The multimedia device may transmit a test message to the configured extender device, and receive a response from the configured extender device.

Figure 8:
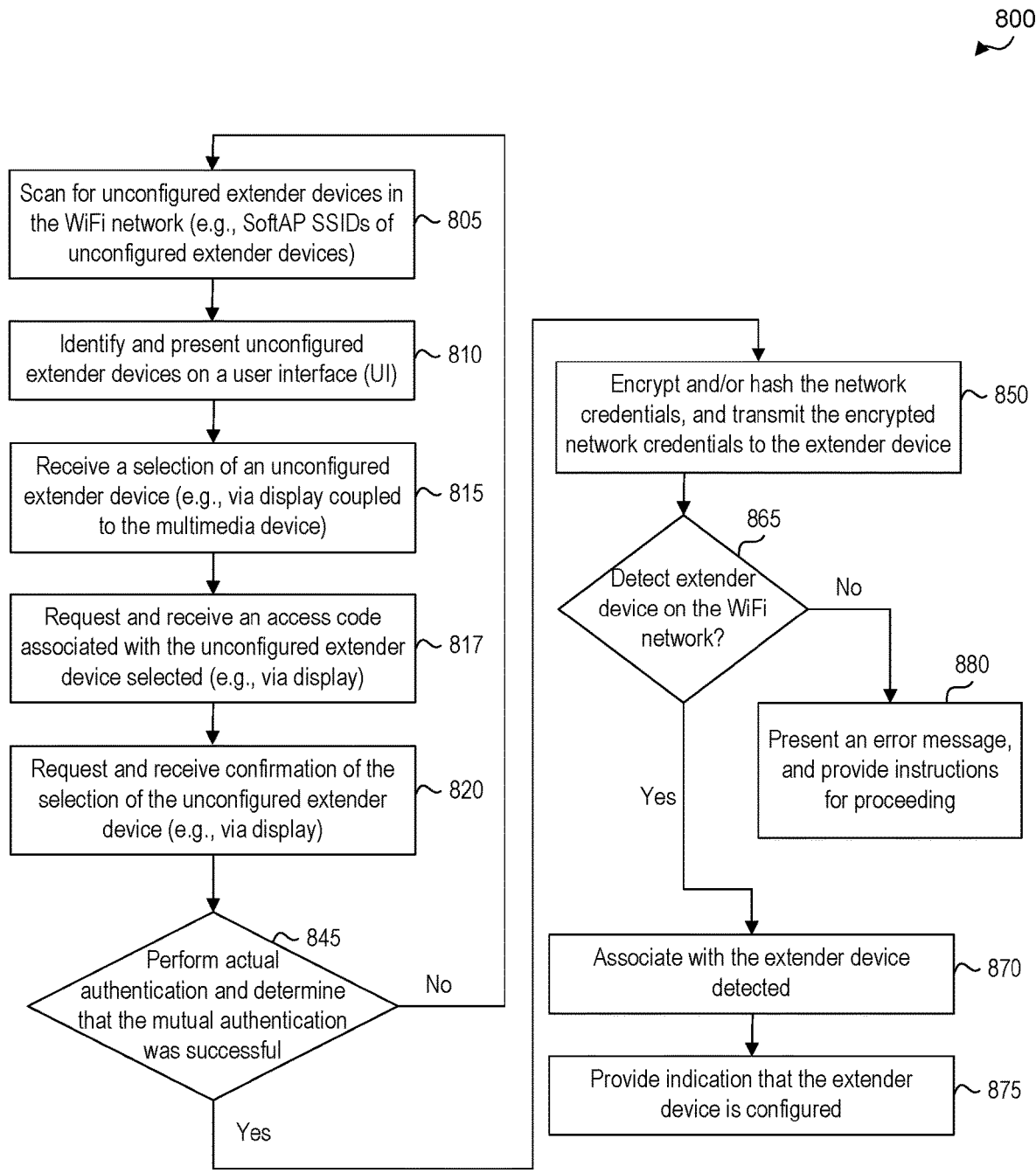
FIG. 8 illustrates an example method for configuring an extender device via a user interface (UI), according to some embodiments of the disclosure.

FIG. 8 illustrates an example method 800 for configuring an extender device 180 via a user interface (UI), according to some embodiments of the disclosure. For explanation purposes, example method 800 may be described with elements from previous figures. Examples of system 200 that may perform method 800 include but are not limited to multimedia devices 110. Based on the description herein, other systems may perform the operations of method 800; these other systems are within the spirit and scope of the disclosure. It is to be appreciated that not all operations may be needed to perform the disclosure provided herein. Further, some of the operations may be performed simultaneously or in a different order than shown in FIG. 8.

At 805, system 200 scans for unconfigured extender devices in the WiFi network (e.g., multimedia device 110 may scan for SoftAP SSIDs and/or use Probe Responses to detect extender device 180).

At 810, system 200 identifies and presents unconfigured extender devices onto a user interface (UI). For example system 200 may present the detected unconfigured extender devices that were detected on display 250 (or display device 105), where display 250 may be a TV UI and/or a touchscreen UI. System 200 may request a selection of an unconfigured extender device. For example system 200 may indicate "New extender devices associated with the multimedia service have been detected. Please select the extender device to be added to your network."

At 815, system 200 receives a selection of an unconfigured extender device (e.g., extender device 180) via a touchscreen display 250 (or display device 105) coupled to the multimedia device or via a remote control of display 250 (or display device 105).

At 817, system 200 requests and receives an access code associated with the unconfigured extender device selected (e.g., via display 250 or display device 105). For example, the request may be a challenge question presented on display 250 or display device 105 to confirm that the customer has possession of extender device 180 that corresponds to the extender device selected. The access code may be on the extender device 180 and/or be in documents (e.g., instructions manuals, quick start guide, etc.) in the box of extender device 180. The customer may enter the access code via a touchscreen and/or a remote control associated with display 250 and/or display device 105.

At 820, system 200 requests and receives confirmation of the selection of the unconfirmed extender device 180. Again, the confirmation may be received via touchscreen and/or a remote control associated with display 250 and/or display device 105.

At 845, system 200 performs a mutual authentication with extender device 180 selected and confirmed by the customer. When system 200 determines that the mutual authentication was successful, method 800 proceeds to 850. When mutual authentication is not successful, method 800 proceeds to 805 to detect an extender device.

At 850, system 200 encrypts and/or hashes the network credentials of the WiFi network and transmits the encrypted and/or hashed network credentials to extender device 180.

At 865, system 200 determines whether extender device 180 is detected on the WiFi network (e.g., to determine whether the network credentials were successfully transferred.) When extender device 180 is detected, method 800 proceeds to 870. When extender device 180 is not detected, method 800 proceeds to 880.

At 880, system 200 may present an error message that the extender device selected was not successfully configured, and provide instructions for proceeding. For example, the instructions may include moving the extender device closer to multimedia device 110 and rebooting extender 180. The error message may also indicate what step or portion of procedure failed.

At 870, system 200 associates with extender device 180 that was detected and selected.

At 875, system 200 provides an indication that the extender device is configured. For example, the indication may be on display 250, or display device 105.

Figure 9:
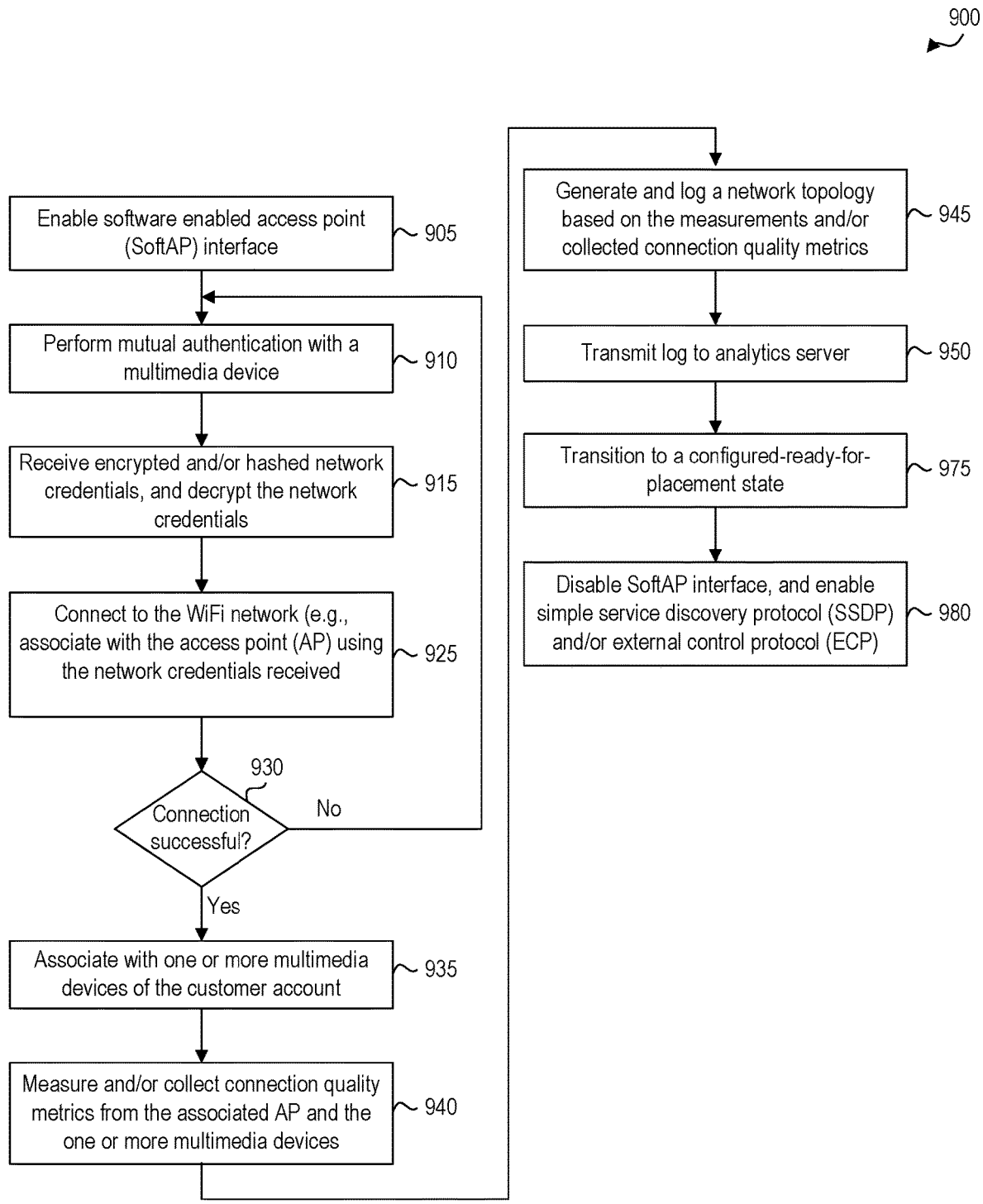
FIG. 9 illustrates an example method for an extender device to communicate with a multimedia device, according to some embodiments of the disclosure.

FIG. 9 illustrates an example method 900 for an extender device 180 to communicate with a multimedia device 110, according to some embodiments of the disclosure. For explanation purposes, example method 900 may be described with elements from previous figures. Examples of system 200 that may perform method 900 include but are not limited to extender device 180. Based on the description herein, other systems may perform the operations of method 900; these other systems are within the spirit and scope of the disclosure. It is to be appreciated that not all operations may be needed to perform the disclosure provided herein. Further, some of the operations may be performed simultaneously or in a different order than shown in FIG. 9.

At 905, system 200 enables a software enabled access point (SoftAP) interface. For example, extender device 180 may be unboxed and powered. Once SoftAP is enabled, extender device 180 may transmit a WiFi beacon that includes a SoftAP SSID (that is different than the SSID that corresponds to the network credentials of the WiFi network).

At 910, system 200 performs mutual authentication with a multimedia device.

At 915, system 200 receives encrypted and/or hashed network credentials, and decrypts the network credentials.

At 925, system 200 connects to the WiFi network using the network credentials received (e.g., connects to AP 130.)

At 930, when system 200 determines that the connection is successful, method 900 proceeds to 935. When system 200 determines that the connection is not successful, then method 900 returns to 910.

At 935, system 200 associates with one or more multimedia devices 110 of the customer account. For example, extender 180 becomes an AP and the one or more multimedia devices 110a-110c may associate with extender 180 rather than directly with AP 130.

At 940, system 200 measures and/or collects connection quality metrics from the associated AP 130 and the one or more multimedia devices 110a-110c that associate with extender device 180. System 200 may record and log the measurements and/or collected connection quality metrics.

At 945, system 200 generates and logs a network topology based on the measurements and/or collected connection quality metrics.

At 950, system 200 transmits the record logs to analytics server 160.

At 975, system 200 transitions to a configured-ready-for-placement state.

At 980, system 200 disables SoftAP interface and enables simple service discovery protocol (SSDP) and/or external control protocol (ECP).

Pre-Configuring an Extender Device

Some embodiments include pre-configuring an extender device with network credentials associated with the customer account before an extender device that is ordered is delivered to the customer's premises. For example, a customer may be prompted for permission to store network credentials associated with the customer's multimedia service customer account in a multimedia service provider's network. The network credentials may be stored in a cloud server (e.g., website server 170.) Subsequently, when the customer orders an extender device online (e.g., via website server 170), the extender device may be pre-configured with the network credentials that were previously stored. Once the pre-configured extender device is delivered, unboxed, and powered, the pre-configured extender device is ready for placement.

Figure 10:
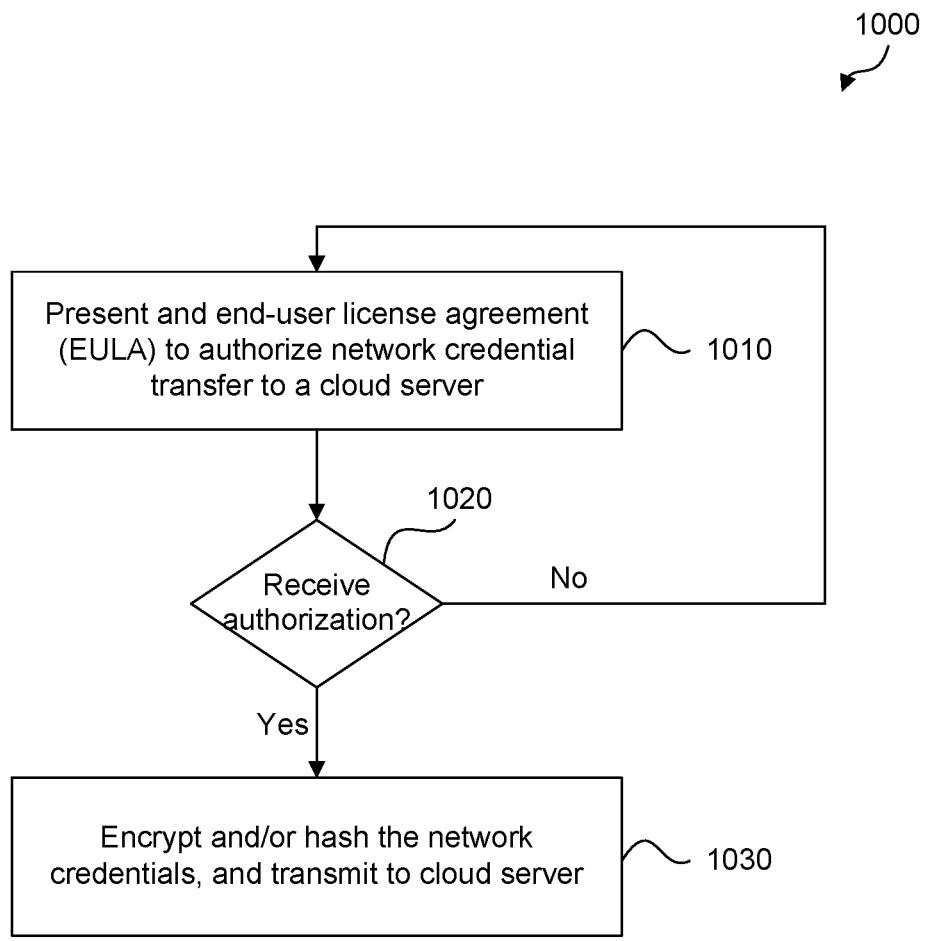
FIG. 10 illustrates an example method for pre-configuring an extender device, according to some embodiments of the disclosure.

FIG. 10 illustrates an example method 1000 for pre-configuring an extender device 180, according to some embodiments of the disclosure. For explanation purposes, example method 1000 may be described with elements from previous figures. Examples of system 200 that may perform method 1000 include but are not limited to multimedia device 110. Based on the description herein, other systems may perform the operations of method 1000; these other systems are within the spirit and scope of the disclosure. It is to be appreciated that not all operations may be needed to perform the disclosure provided herein. Further, some of the operations may be performed simultaneously or in a different order than shown in FIG. 10.

At 1010, system 200 may present an end-user license agreement (EULA) or consent agreement to authorize transfer of network credentials associated with the customer account to a cloud server. For example, multimedia device 110 may request permission from a customer to store network credentials of a WiFi network to which multimedia device 110 is connected at a cloud storage server, such as website server 170. The multimedia device 110 and the network credentials are associated with the customer account.

At 1020, system 200 determines whether authorization to transfer and store the network credentials at the cloud server is received. When authorization is received, method 1000 proceeds to 1030. When authorization is not received, method 1000 returns to 1010. For example, multimedia device 110 may receive the permission from a customer via a touchscreen display 250 (or display device 105) coupled to the multimedia device 110 or via a remote control of display 250 (or display device 105). The remote control may be a TV remote control.

At 1030, system 200 encrypts and/or hashes the network credentials, and transmits the encrypted and/or hashed network credentials to the cloud server. For example, multimedia device 110 may encrypt and/or hash the network credentials associated with the customer account, and transfer the encrypted and/or hashed network credentials to website server 170. The network credentials may include the SSID and password of the WiFi network to which the multimedia device 110 is connected. In some embodiments the network credentials may include a secondary SSID and secondary password associated with the customer account.

Subsequently, the customer account server may receive an order for an extender device to be associated with the customer account, transfer and store the network credentials associated with the customer account in the extender device (e.g., pre-configure the extender device 180) before the extender device is delivered to a customer premise associated with the customer account. After the pre-configured extender device is delivered, unboxed, and powered, the extender device is ready for placement.

Placing an Extender Device

Once a new extender device is connected to the home WiFi network, some customers have a difficult time determining where to physically place the configured extender device. Embodiments include analyzing measurements in a particular environment associated with a multimedia service, and determining a desirable location for placing the configured extender device in the particular environment based on the multimedia service. In some embodiments, the above functions are performed by an application on a mobile communications device 125 in the particular environment. The measurements may include received signal strength indication (RSSI), signal-to-noise ratios (SNR), and data rates in the uplink and downlink directions on various links of the extender device, where the extender device provides multimedia service. For example, the extender device may support multimedia devices associated with the same multimedia service customer account. Focusing support only on multimedia devices associated with the same multimedia service account enables embodiments to improve the multimedia service (e.g., multimedia streaming) and improves a customer's multimedia service experience. Embodiments also include periodic analysis for placement adjustment.

Figure 11:
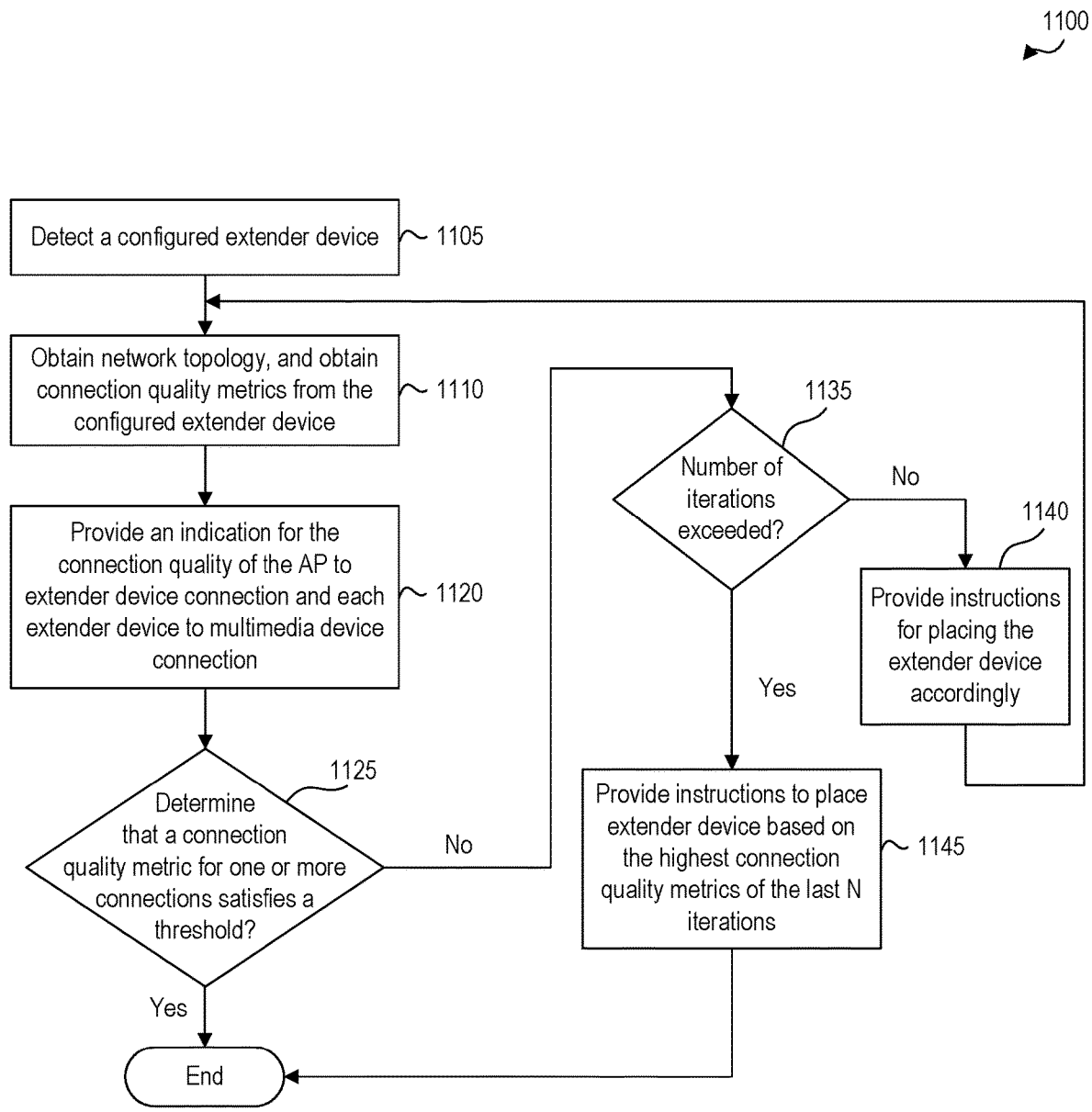
FIG. 11 illustrates an example method for determining placement of an extender device, according to some embodiments of the disclosure.

FIG. 11 illustrates an example method 1100 for determining placement of an extender device 180, according to some embodiments of the disclosure. For explanation purposes, example method 1100 may be described with elements from previous figures. Examples of system 200 that may perform method 1100 include but are not limited to mobile communications device 125. Based on the description herein, other systems may perform the operations of method 1100; these other systems are within the spirit and scope of the disclosure. It is to be appreciated that not all operations may be needed to perform the disclosure provided herein. Further, some of the operations may be performed simultaneously or in a different order than shown in FIG. 11.

At 1105, system 200 detects a configured extender device. For example, system 200 may detect extender device 180 that has booted up and is communicatively coupled to the WiFi network (e.g., extender device is in a configured state).

At 1110, system 200 obtains network topology from the configured extender device and obtains connection quality metrics from the configured extender device, where the configured extender device may periodically or at boot up, measure and/or collect connection quality metrics. For example, mobile communications device 125 may utilize BLE messaging to obtain the network topology and connection quality metrics from extender device 180 via connection 190a. In another example, mobile communications device 125 may utilize ECP messaging via connection 135a and the WiFi network (e.g., connection 185d) to obtain the network topology and connection quality metrics from extender device 180. Multimedia devices 110 coupled to extender device 180 may also obtain network topology and connection quality metrics using ECP messaging over the WiFi network (e.g., using connections 185a-185c.) In some embodiments system 200 may receive a recommendation message to adjust the placement of extender device 180 from a multimedia device 110c via interface 190b.

Examples of the connection quality metrics for a communication link between extender device 180 and AP 130 (e.g., connection 185d) include but are not limited to: RSSI, a time-average of downlink SNR values, a time-average of uplink SNR values, uplink and downlink data rates between extender device 180 and AP 130, time-averaged packet error rates on downlink and/or uplink between extender device 180 and AP 130, retry counters in uplink and downlink directions between extender device 180 and AP 130, downlink and uplink throughput measurements, and/or noise at extender device 180. Examples of the connection quality metrics for a communication link between extender device 180 and a multimedia device 110 (e.g., connection 185a, 185b, or 185c) include but are not limited to: RSSI, time-average of downlink and uplink SNR, packet error rates on uplink and downlink, measured throughput on uplink and downlink, as well as uplink and downlink data rates between extender device 180 and respective multimedia devices 110. In some embodiments, extender device 180 may query multimedia devices 110 to obtain time-average of downlink SNR. For example, at least 10 SNR samples may be collected over less than 15 seconds rather than an instantaneous measure. In some embodiments, the connection quality metrics pertain only to multimedia services associated with the customer account. In some embodiments, extender device 180 is particular to the environment and to the multimedia service customer account. Further, extender device 180 may collect measurements during an end-to-end throughput tests in the uplink and downlink directions from/to a test server (e.g., analytics server 160). The measured and/or collected connection quality metrics and end-to-end throughput test results may be transmitted periodically or on demand to analytics server 160.

At 1120, system 200 provides an indication for the connection quality of the AP 130↔extender device 180 connection, and each extender device 180↔multimedia device 110 connection. In an embodiment, the indications may be displayed according to the network topology obtained. For example, system 200 may provide indications on display 250 (or display device 105) that depict extender device 180, AP 130, and one or more multimedia devices 110 as well as their corresponding connections 185. A first indication may represent connection 185d, and a second indication may represent connection 185c. When multimedia devices 110b and 110a are present, then corresponding third and fourth indications may represent connection 185b and 185a, respectively.

System 200 may provide a graphic of the network topology and display the connection quality indications. System 200 may provide explicit suggestions so that a customer may move extender device 180 accordingly to improve the quality of multimedia service (e.g., streaming service associated with the customer account.) For example, if the AP-Extender connection quality is poor, system 200 may display a message on display 250 suggesting that the user move extender device 180 closer to AP 130. The connection quality indication may be associated with a comparison of one or more connection quality metrics with one or more configurable threshold values. When a connection quality is poor (e.g., the connection quality metrics for that connection satisfies one or more threshold values), the connection quality is depicted accordingly. In some embodiments, the threshold values may be configurable, and may be different for different products corresponding to System 200. For a color rating system, for example, a poor connection quality may be shown as yellow while a worse connection quality may be shown as red. When a connection quality is acceptable, the connection quality may be shown as green. For example, the indications may be color coded as follows, but other labels may also be used:

| AP-Extender Device Connection: Connection Quality Indication Color | Relationship with Thresholds |
| --- | --- |
| Red | Extender device not associated with AP of WiFi network, or associated but Time average of downlink SNR < Low Threshold (e.g., 10 dB) |
| Yellow | Time average of downlink SNR > Low Threshold, and Time average of downlink SNR < High Threshold (e.g., 30 dB) |
| Green | Time average of downlink SNR > High Threshold |

| Extender Device-Multimedia Device Connection: Connection Quality Indication Color | Relationship with Thresholds |
| --- | --- |
| Red | Multimedia device is associated but Time average of downlink SNR < Low Threshold (e.g., 10 dB) |
| Yellow | Time average of downlink SNR > Low Threshold, and Time average of downlink SNR < High Threshold (e.g., 30 dB) |
| Green | Time average of downlink SNR > High Threshold |

When more than one multimedia device 110 is coupled to extender device 180, system 200 may provide a connection quality indication for each multimedia device 110↔extender device 180 connection. System 200 may also provide more detailed connection quality metrics for each of the connections (e.g., wireless links 185) as described above.

In an embodiment, extender device 180 may include connection quality indications such as two light emitting diodes (LEDs) that may be used to recommend placement of extender device 180. In an embodiment, the two LEDs of extender device 180 may be used in conjunction with system 200 (e.g., mobile communications device 125) as described in method 1100 to place extender device 180. For example, each LED may have 3 colors, green, yellow, and red that correlates to the indicators described above to imply movement recommendations for extender device 180. LED1 may provide an indication of AP 130↔extender device 180 connection quality. LED2 may provide an indication of a multimedia device 110↔extender device 180 connection quality. If either LED1 or LED2 is red, the customer is advised (e.g., explained in a quick start guide (QSG) to move the extender device closer to AP 130 or multimedia device 110, respectively. If both LED1 and LED2 are red, the customer is advised to move the extender device closer to both AP 130 and multimedia device 110. Similar instructions are provided when LED1 and/or LED2 are yellow. In the event that multiple multimedia devices are connected through extender device 180, LED2 may display the connection quality corresponding to the multimedia device that has the weakest connection (e.g., poorest connectivity quality metrics.) In an embodiment, a single LED may be used to indicate the need for placement adjustment. For example, the LED may be red if the extender does not have a connection to the AP; yellow if the extender is connected to the AP and one or more multimedia devices, but the connection quality is sub-optimal; and green if the extender device has good connection quality to the AP and the one or more multimedia devices.

At 1125, system 200 determines whether connection quality metrics for one or more connections are satisfactory. For example, using the above color connection quality indications, when all of the connections are green, extender device 180 is in a satisfactory location and method 1100 ends. When any of the connection quality metrics for any connections are not satisfactory (e.g., yellow or red), system 200 may record a combination of the connection quality metrics for this iteration at this location relative to the locations of AP 130 and/or multimedia devices 110. Method 1100 proceeds to 1135. At 1135, system 200 determines whether a number of iterations has been exceeded. For example, mobile communications device 125 may be used to assist a customer in placing extender device 180 a given number of times, N, where N is a settable integer greater than 1. As an example, N may be equal to 4 and after 4 iterations, method 1100 proceeds to 1145. When the number of iterations, N, has not been exceeded, system 200 proceeds to 1140.

At 1140, system 200 provides instructions for moving the extender device accordingly to improve the quality of the connections. For example, system 200 may have received a placement adjustment recommendation (e.g., from analytics server 160, extender device 180, and/or one or more multimedia devices 110). For example, analytics server 160 may detect that an average SNR for an AP 130↔extender device 180 connection or an average SNR of a multimedia device 110↔extender device 180 connection over a 6-hour window is less than a Low Threshold (e.g., 20 dB), and transmit a placement adjustment recommendation to system 200 via connection 135a. System 200 may provide instructions on display 250 (or display device 105) or input/output interfaces 270 (e.g., audio instructions) to move extender device 180 closer to AP 130 and/or closer to multimedia 110 if the connection quality is not satisfactory (e.g., the connection quality is yellow or red). System 200 may provide a graphic of the network topology and display the connection quality indications so that a customer may move extender device 180 accordingly to improve the quality of multimedia service (e.g., streaming service.) System 200 returns to 1110 for another iteration to verify that this new position results in improved quality of the connections. In the event the extender device is unplugged and moved (e.g., as provided in the instructions), the configured extender device 180 may be detected at 1105 when rebooted. In some embodiments, the number of iterations, N, is retained.

Returning to 1145 when the number of iterations has been exceeded, system 200 may provide instructions to place extender device 180 based on the highest combination of the connection quality metrics of the last N iterations. For example, when N is 4, system 200 selects the highest connection quality metrics of the last 4 iterations and their locations. In some embodiments their locations are relative to the locations of AP 130 and/or multimedia devices 110.

In some embodiments, a multimedia device 110 may periodically obtain connection quality metrics from the configured and placed extender device 180, and perform an analysis to determine a placement recommendation for the configured extender device 180. Multimedia device 110 may provide a recommendation to a customer via a user interface (UI), and the recommendation may be displayed on display 250. or display device 105.

Selecting an Access Point (AP)

The customer premise environment may include a plurality of access points (APs) that may include an extender device, and a plurality of multimedia devices. Some multimedia devices select and associate with an AP that has a highest or strongest RSSI over one link. As WiFi networks become more complex with more devices, some embodiments include mechanisms for analyzing measurements at a multimedia device, determining end-to-end performance in the particular environment, selecting a desired AP of the plurality of APs with which to associate, and connecting to the desired AP to achieve more reliable WiFi network connections. Thus, the selection of the desired AP may result in a more desirable connection quality and multimedia streaming performance. Some embodiments include determining a desired AP that may be an extender device, to which a multimedia device of the plurality of multimedia devices may associate.

Figure 12:
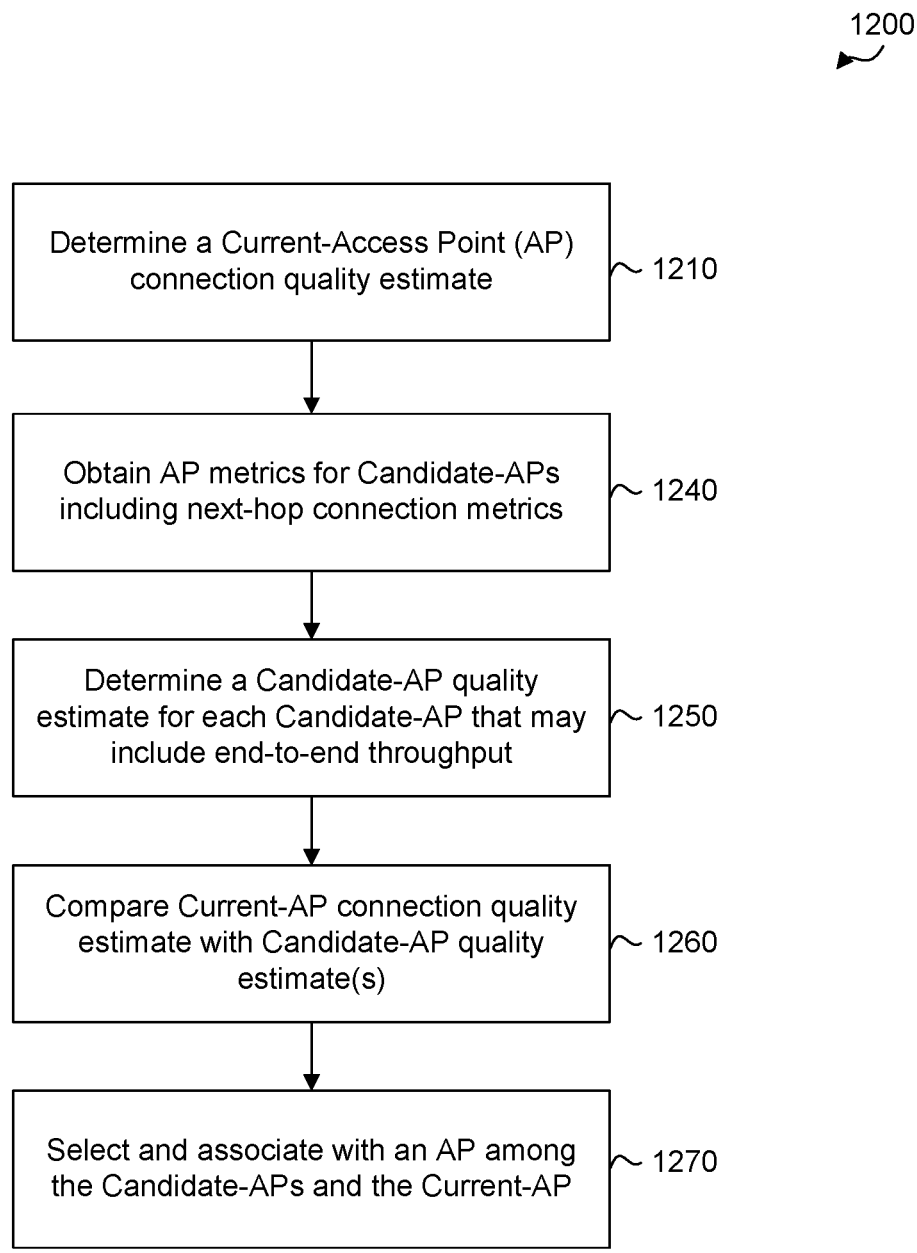
FIG. 12 illustrates an example method for choosing an access point (AP), according to some embodiments of the disclosure.

FIG. 12 illustrates an example method 1200 for choosing an access point (AP), according to some embodiments of the disclosure. For explanation purposes, example method 1200 may be described with elements from previous figures. Examples of system 200 that may perform method 1200 include but are not limited to multimedia devices 110. Based on the description herein, other systems may perform the operations of method 1200; these other systems are within the spirit and scope of the disclosure. It is to be appreciated that not all operations may be needed to perform the disclosure provided herein. Further, some of the operations may be performed simultaneously or in a different order than shown in FIG. 12.

Embodiments enable a multimedia device to make an assessment during a scanning process (e.g., a channel scan), where the assessment is based at least on relevant metrics/predictors of AP connection quality. As an example, we assume that multimedia device 110c is coupled to AP 130 via connection 135d, and that extender device 180 may be operating on a different frequency band and is coupled to AP 130 via connection 185d. Extender device 180 and multimedia device 110a-110c are associated with a customer account (e.g., a same customer account ID).

At 1210, system 200 determines a Current-Access Point (AP) connection quality estimate. The Current-AP connection quality estimate may be an estimate of the reliable throughput attainable with the Current-AP (e.g., AP 130.) The Current-AP connection quality estimate may be a composite of multiple metrics of the current channel including SNR, RSSI, noise level, modulation and coding scheme (MCS) rates, AP capabilities, packet error rates, and/or airtime availability. For example, multimedia device 110c may be coupled to AP 130. Multimedia device 110c may determine a Current-AP connection quality estimate based on a composite of multiple metrics described above associated with connection 135d. At 1240, system 200 obtains AP metrics for Candidate-APs including next-hop connection metrics. For example, multimedia device 110c may scan a channel associated with a Candidate-AP, and capture one or more of the following AP metrics for each Candidate-AP: downlink RSSI and SNR, noise level on the channel, frequency band and channel, airtime availability on the channel, radio and network information metrics including Channel Load, AP capabilities, and next-hop connection metrics (e.g., when the Candidate-AP is an extender device (e.g., extender device 180) associated with an AP (e.g., AP 130). Examples of AP capabilities include but are not limited to: supported MCS rates, High Throughput (HT) and Very HT (VHT) support, a number of streams, channel bandwidth, multiple-input and multiple-output (MIMO) features such as beamforming, and multi-user MIMO, and an ability to exchange network topology information. Next-hop connection metrics may include but are not limited to: RSSI, SNR, latency, packet error rate, effective rate, and/or effective throughput.

For example, multimedia device 110c may scan a channel associated with extender device 180, a Candidate-AP, via connection 185c, and capture the one or more AP metrics for extender device 180 as described above. In addition, extender device 180 may provide next-hop connection metrics associated with connection 185d to AP 130 (e.g., provide next-hop connection metrics in beacons.) In some embodiments, extender device 180 obtains the next-hop connection metrics via WiFi beacons and Probe Responses (e.g., via an 802.11 information element.)

At 1250, system 200 determines a Candidate-AP quality estimate for each Candidate-AP that may include end-to-end throughput. For example, multimedia device 110c may calculate a Candidate-AP quality estimate based on the Candidate-AP metrics obtained at 1240, where the Candidate-AP quality estimate may be an estimate of the throughput and reliability of an end-to-end connection through the Candidate-AP. As described above, the Candidate-AP quality metric may include the multi-hop effects (e.g., AP metrics associated with connections 185c and 185d).

At 1260, system 200 compares the Current-AP connection quality estimate with the Candidate-AP quality estimate(s), to determine which AP may result in a more desirable end-to-end throughput with a more desirable reliability. For example, the RSSI of 135d may be higher than the RSSI of 185c, but taking the end-to-end AP metrics into account may result in a determination that extender device 180 is more desirable than AP 130.

At 1270, system 200 selects and associates with an AP among the Candidate-APs and the Current-AP that may result in a more desirable end-to-end throughput with a more desirable reliability.

In an embodiment, system 200 periodically evaluates the connection quality for the Current-AP and for Candidate APs, in order to select the AP with a highest throughput and/or reliability. In an embodiment, system 200 determines whether the Current-AP connection quality estimate satisfies a threshold, and repeats method 1200 when the Current-AP connection quality is insufficient. For example, when multimedia device 110c determines that the Current-AP connection quality is below a first threshold value, then the Current-AP connection quality estimate may be insufficient. For example, if a Current-AP connection quality estimate is 40 and the first threshold value is 50, then the Current-AP connection quality estimate is insufficient. In another example, multimedia device 110c determines that the Current-AP connection quality estimate is insufficient when metrics from an alternative AP (e.g., quality metrics from a Candidate-AP) exceeds a second threshold value, even when the Current-AP connection quality estimate is not below the first threshold value. For example, if a Current-AP connection quality estimate is 70, the first threshold value is 50, the second threshold value is 80, and an alternative AP metric is 90, then the Current-AP connection quality estimate is insufficient, even though the first threshold value of 50 has not been exceeded. The threshold values are settable. In some embodiments the second threshold may be associated with the value of the Current-AP connection quality estimate that is greater than the first threshold value (e.g., the second threshold value is 80 (14% above the Current-AP connection quality estimate of 70.) When the Current-AP connection quality estimate is insufficient, method 1200 may be repeated.

Figure 13:
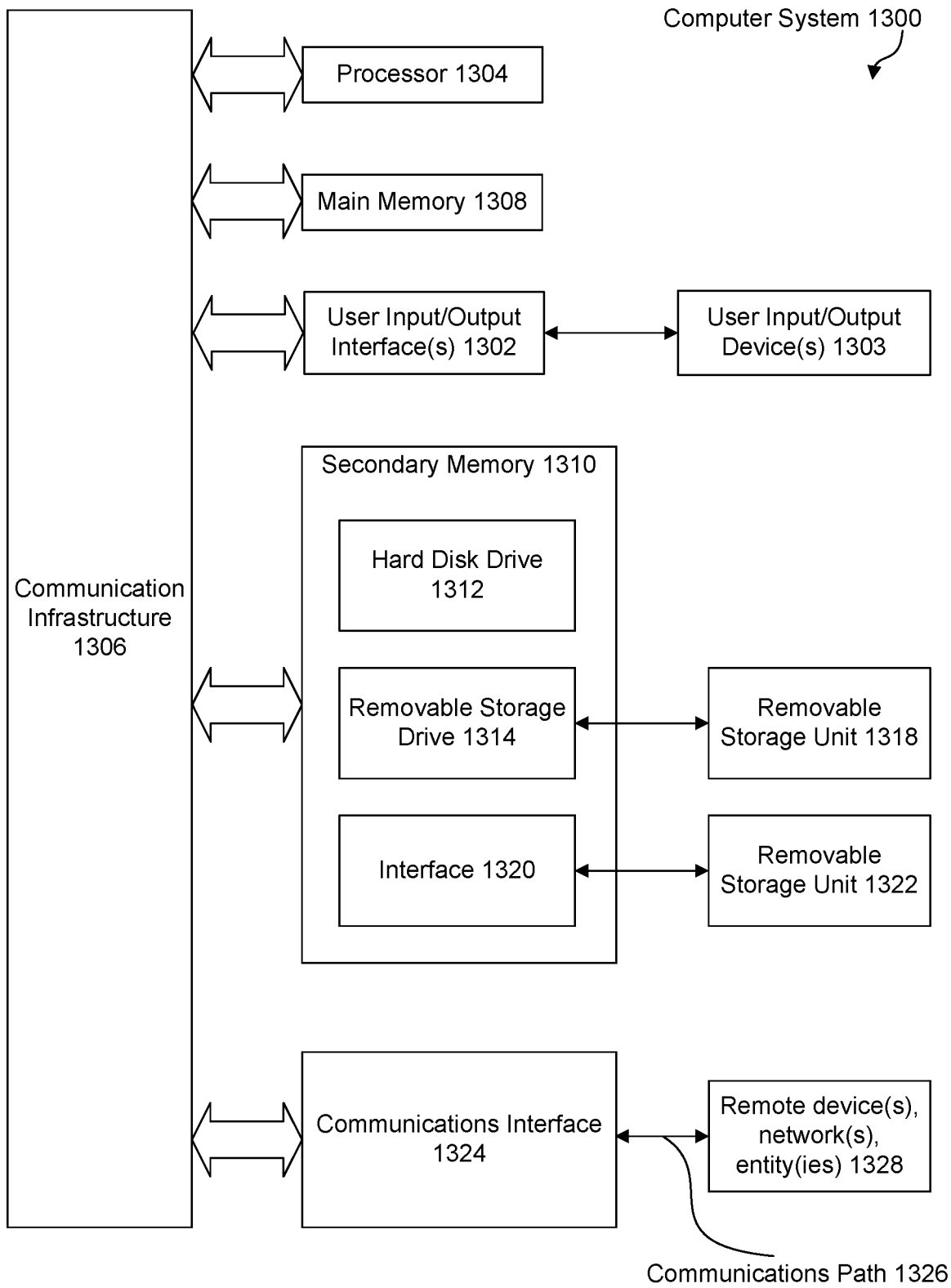
FIG. 13 illustrates an example computer system for implementing some embodiments or portion(s) thereof.

Various embodiments can be implemented, for example, using one or more computer systems, such as computer system 1300 shown in FIG. 13. Computer system 1300 can be any well-known computer capable of performing the functions described herein. For example, and without limitation, analytics server 160, website server 170, content provider 1450a-content provider 1450m, computing device 145, electronic devices such as laptops, desktops as described with regard to FIG. 15. Computer system 1300 includes one or more processors (also called central processing units, or CPUs), such as a processor 1304. Processor 1304 is connected to a communication infrastructure or bus 1306. Computer system 1300 also includes user input/output device(s) 1303, such as monitors, keyboards, pointing devices, etc., that communicate with communication infrastructure 1306 through user input/output interface(s) 1302. Computer system 1300 also includes a main or primary memory 1308, such as random access memory (RAM). Main memory 1308 may include one or more levels of cache. Main memory 1308 has stored therein control logic (e.g., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

According to some embodiments, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

The operations in the preceding embodiments can be implemented in a wide variety of configurations and architectures. Therefore, some or all of the operations in the preceding embodiments may be performed in hardware, in software or both. In some embodiments, a tangible apparatus or article of manufacture comprising a tangible computer useable or readable medium having control logic (software) stored thereon is also referred to herein as a computer program product or program storage device. This includes, but is not limited to, computer system 1300, main memory 1308, secondary memory 1310 and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 13. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A system for an extender device, comprising:
a transceiver; and
one or more processors communicatively coupled to the transceiver, and configured to:
receive, via the transceiver, a discovery message;
in response to the discovery message, transmit, via the transceiver, a response comprising an indication of an unconfigured state;
subsequent to the transmission, receive, via the transceiver, network credentials corresponding to a multimedia service account;
connect, via the transceiver, to a network using the network credentials;
associate with a multimedia device corresponding to the multimedia service account on the network; and
transition to a configured-ready-for placement state, wherein the extender device comprises a plurality of light emitting diodes (LEDs) that correlate to indicators implying movement recommendations for placement of the extender device, wherein a first LED of the plurality of LEDs corresponds to a first connection quality indication between an access point (AP) and the extender device, and wherein a second LED of the plurality of LEDs corresponds to a second connection quality indication between the multimedia device and the extender device.

2. The system of claim 1, wherein to connect to the network, the one or more processors are configured to: associate with the AP on the network.

3. The system of claim 2, wherein the one or more processors are further configured to: measure connection quality metrics from the AP and the multimedia device; and
generate a network topology based at least on the connection quality metrics.

4. The system of claim 3, wherein the one or more processors are further configured to:
log the network topology;
receive a network topology query; and
in response to the network topology query, transmit the log to an analytics server.

5. The system of claim 1, wherein the network credentials comprise a login and password.

6. The system of claim 1, wherein the discovery message is received via Bluetooth™ protocol or software enabled access point (SoftAP).

7. A method for an extender device, comprising:
receiving a discovery message;
in response to the discovery message, transmitting a response comprising an indication of an unconfigured state;
subsequent to the transmission, receiving network credentials corresponding to a multimedia service account;
connecting to a network using the network credentials;
associating with a multimedia device corresponding to the multimedia service account on the network; and
transitioning to a configured-ready-for placement state, wherein the extender device comprises a plurality of light emitting diodes (LEDs) that correlate to indicators implying movement recommendations for placement of the extender device, wherein a first LED of the plurality of LEDs corresponds to a first connection quality indication between an access point (AP) and the extender device, and wherein a second LED of the plurality of LEDs corresponds to a second connection quality indication between the multimedia device and the extender device.

8. The method of claim 7, wherein the connecting to the network comprises: associating with the AP on the network.

9. The method of claim 8, further comprising:
measuring connection quality metrics from the AP and the multimedia device; and
generating a network topology based at least on the connection quality metrics.

10. The method of claim 9, further comprising:
logging the network topology;
receiving a network topology query; and
in response to the network topology query, transmitting the log to an analytics server.

11. The method of claim 7, wherein the network credentials comprise a login and password.

12. The method of claim 7, wherein the discovery message is received via Bluetooth™ protocol or software enabled access point (SoftAP).

13. A non-transitory computer-readable medium having instructions stored therein, which when executed by one or more processors in an electronic device, cause the one or more processors to perform operations for an extender device, the operations comprising:
receiving a discovery message;
in response to the discovery message, transmitting a response comprising an indication of an unconfigured state;
subsequent to the transmission, receiving network credentials corresponding to a multimedia service account;
connecting to a network using the network credentials;
associating with a multimedia device corresponding to the multimedia service account on the network; and
transitioning to a configured-ready-for placement state, wherein the extender device comprises a plurality of light emitting diodes (LEDs) that correlate to indicators implying movement recommendations for placement of the extender device, wherein a first LED of the plurality of LEDs corresponds to a first connection quality indication between an access point (AP) and the extender device, and wherein a second LED of the plurality of LEDs corresponds to a second connection quality indication between the multimedia device and the extender device.

14. The non-transitory computer-readable medium of claim 13, wherein the connecting to the network operation comprises: associating with the AP on the network.

15. The non-transitory computer-readable medium of claim 14, wherein the operations further comprise:
measuring connection quality metrics from the AP and the multimedia device; and
generating a network topology based at least on the connection quality metrics.

16. The non-transitory computer-readable medium of claim 15, wherein the operations further comprise:
logging the network topology;
receiving a network topology query; and
in response to the network topology query, transmitting the log to an analytics server corresponding to the multimedia service account.

17. The non-transitory computer readable medium of claim 13, wherein the discovery message is received via Bluetooth™ protocol or software enabled access point (SoftAP).

18. The non-transitory computer readable medium of claim 17, wherein the operations further comprise:
turning off Bluetooth™ protocol or SoftAP; and
enabling simple service discovery protocol (SSDP) or external control protocol (ECP).

19. The non-transitory computer readable medium of claim 13, wherein the operations further comprise verifying the connection to the network, comprising:
receiving a query regarding an internet protocol (IP) address of the extender device; and
responding to the query with the IP address of the extender device.

20. The non-transitory computer readable medium of claim 13, wherein the network credentials comprise a login and password.

* * * * *